(12) United States Patent
Ausubel

(10) Patent No.: US 7,062,461 B1
(45) Date of Patent: Jun. 13, 2006

(54) SYSTEM AND METHOD FOR AN EFFICIENT DYNAMIC MULTI-UNIT AUCTION

(75) Inventor: Lawrence M. Ausubel, Washington, DC (US)

(73) Assignee: Efficient Auctions LLC, Washington, DC (US)

( * ) Notice: Subject to any disclaimer, the term of this patent is extended or adjusted under 35 U.S.C. 154(b) by 0 days.

(21) Appl. No.: 09/573,007

(22) Filed: May 18, 2000

Related U.S. Application Data

(60) Provisional application No. 60/134,666, filed on May 18, 1999.

(51) Int. Cl.
*G06F 17/60* (2006.01)

(52) U.S. Cl. .......................................... 705/37; 705/35
(58) Field of Classification Search ............. 705/25–42
See application file for complete search history.

(56) References Cited

U.S. PATENT DOCUMENTS

| | | | | |
|---|---|---|---|---|
| 5,905,975 | A * | 5/1999 | Ausubel | 705/37 |
| 6,415,270 | B1 * | 7/2002 | Rackson et al. | 705/37 |
| 6,449,601 | B1 * | 9/2002 | Friedland et al. | 705/37 |
| 6,510,418 | B1 * | 1/2003 | Case et al. | 705/26 |
| 6,718,312 | B1 | 4/2004 | McAfee et al. | |

FOREIGN PATENT DOCUMENTS

EP      0 845 749 A2 * 6/1998

OTHER PUBLICATIONS

Little, "Auctioning is the wisest choice is you want best value", Government Computer News, v15, n28, p54(2), Nov. 4, 1996, Dialog file 148, Accession No. 09137259.*

* cited by examiner

*Primary Examiner*—Frantzy Poinvil
(74) *Attorney, Agent, or Firm*—Connolly Bove Lodge & Hutz LLP

(57) ABSTRACT

A method and apparatus allow the computer based implementation of an auction of heterogeneous types of items wherein one or more types of the items may include plural items. At any point in the bidding process, the set of feasible assignments of the items, given the bidding state, is the set of all possible allocations of the available quantity of the types of items to the bidders, subject to satisfying all the constraints on the assignment of the items, the constraints on the bidding process and the constraints posed by the bidding state. There may be a time in the auction when, based on the bidding state, one or more items (of one or more types) can only be assigned to one particular bidder in any feasible assignment, i.e., the particular bidder is guaranteed to be assigned the item. Such item is assigned to such bidder at such time.

65 Claims, 12 Drawing Sheets

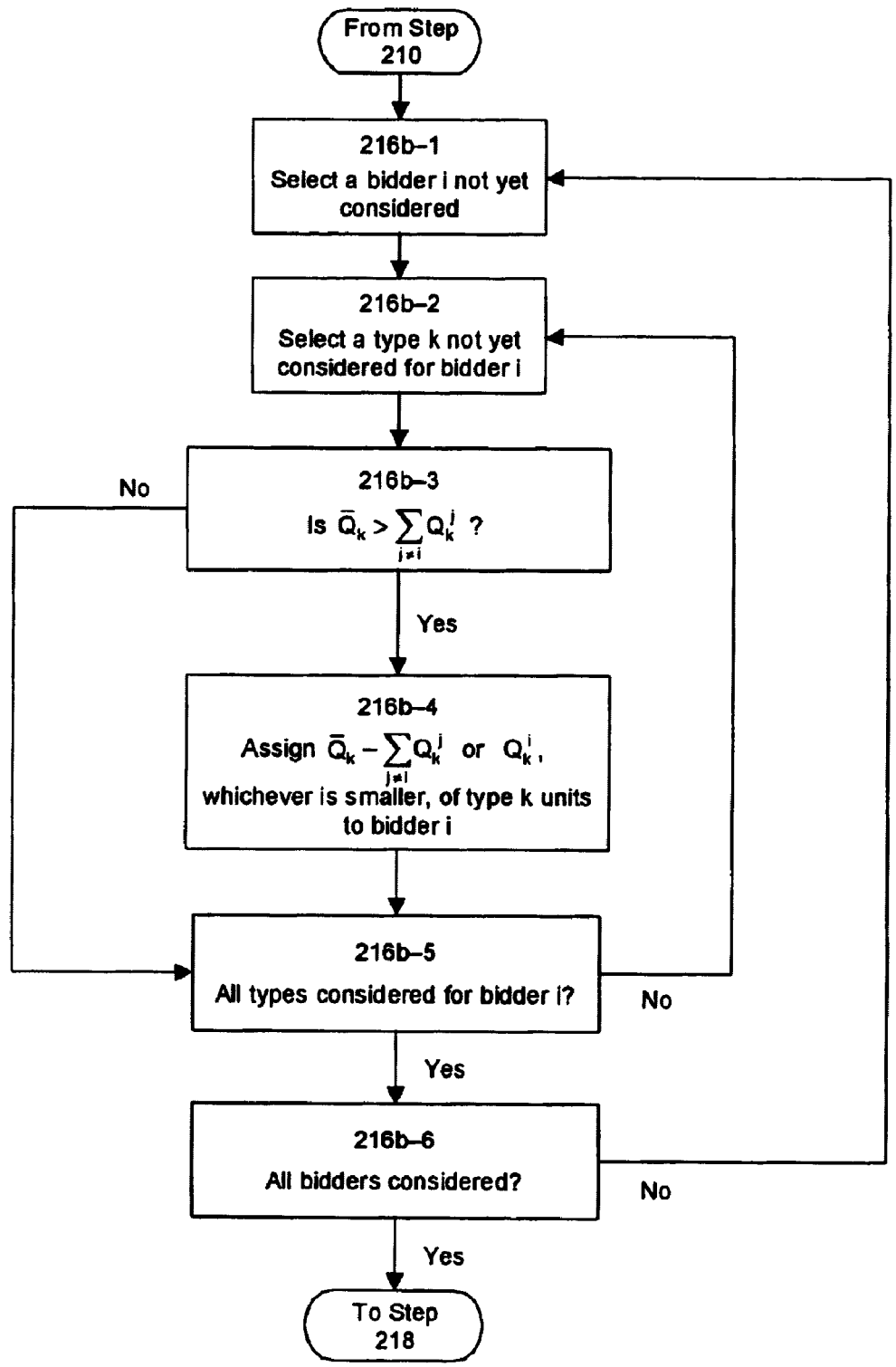

SYSTEM AND METHOD FOR AN EFFICIENT DYNAMIC MULTI-UNIT AUCTION

This application claims the benefit of provisional application No. 60/134,666 filed May 18, 1999.

FIELD OF THE INVENTION

The present invention relates to improving computer-implemented auctions and, more particularly, to computer implementation of an efficient dynamic multi-unit auction.

BACKGROUND OF THE INVENTION

Auction formats in the art tend generally to be of the sealed-bid or ascending-bid variety. In the standard sealed-bid auction, bidders—in one single bidding round—simultaneously and independently submit bids to the auctioneer, who then determines the auction outcome. In the standard ascending-bid auction, bidders—in a dynamic bidding process—submit bids in real time until no more bids are forthcoming. An ascending-bid format offers the advantage that there is feedback between participants' bids: each bidder is able to infer other bidders' information about the value of the object(s) as the auction progresses and incorporate this information into his subsequent bids. This feedback tends to result in more efficient auction outcomes as well as more aggressive bidding, resulting in higher expected revenues for the seller.

However, standard ascending-bid formats—such as the design used by the Federal Communication Commission for auctioning radio communications spectrum—have the disadvantage that they do not generally lead to outcomes which are efficient in the sense of assigning objects to the bidders who value them the most. Most ascending-bid auction formats have the unfortunate property that identical objects sell at the uniform price reached at the end of the auction. This creates incentives for bidders to engage in demand reduction: bidders have incentive to understate the values that they place on marginal units in order to reduce the market-clearing price (and, hence, the price they will pay on the inframarginal units that they will win in any case). This has clear negative implications both for efficiency and for revenues.

My prior patent, "System and Method for an Efficient Dynamic Auction for Multiple Objects," (U.S. Pat. No. 6,026,383, issued 15 Feb 2000) provides an early version of a system and method for a dynamic auctions which may achieve efficiency for situations involving multiple identical objects. The current invention is an improved system and method for a dynamic multi-unit auction which may achieve efficiency in more general economic environments.

SUMMARY OF THE INVENTION

The present invention is a system and method for implementing on a computer a dynamic multi-unit auction in which the price paid or received by bidders tends to be independent of their own bids, in which participants may be provided with information concerning their competitors' bids as the auction progresses, and in which the confidentiality of high values is maintained. This provides the advantage of improving the economic efficiency of the auction design over the prior art. The present invention usefully enables a seller or buyer to efficiently auction multiple types of goods or services, and to efficiently auction items with complex possibilities for substitution.

The present invention comprises a computer that receives bids in a dynamic bidding process and assigns the items to bidders, and a method for receiving bids in a dynamic bidding process and assigning the items to bidders. In one embodiment, the invention comprises a bidding information processor (BIP) and a plurality of bid entry terminals (BET's) communicatively coupled to the bidding information processor. Bidders at the bid entry terminals enter bids in multiple rounds, and may observe displayed auction information. The bidding information processor and the bid entry terminals communicate and process information in order to conduct an auction.

Suppose that m (m≧1) types of objects are being auctioned, and one or more units of each type are being auctioned. An auction in accordance with an embodiment of the present invention proceeds as follows. First, the auctioneer (i.e., the bidding information processor) determines a starting price vector, $(P_1, \ldots, P_m)$, and transmits it to bidders (i.e., bid entry terminals). Second, a bidder responds with a bid vector indicating the quantity of each respective type of object that the bidder wishes to transact at the current price vector. Let the bidders be superscripted by i, where i=1, ..., n. The bid vector for bidder i is denoted by $(Q_1^i, \ldots, Q_m^i)$. Also, let the quantities of the respective types of objects being auctioned be denoted by $(\overline{Q}_1, \ldots, \overline{Q}_m)$. Typically, the aggregate quantity of each type of object desired by all the bidders (i.e., $\Sigma_{i=1}^n Q_k^i$) is greater than the quantity of each type of object being auctioned (i.e., $\overline{Q}_k$). In this event, the auctioneer still determines whether any of the objects should be assigned to any bidders in this round. This is done by determining for each bidder, separately, whether the sum of the quantities bid by all the other bidders for all m types of objects is less than the sum of the quantities of all m types of objects being auctioned. In other words, there is at least one object which is desired by only one bidder. In the event that the auctioneer determines a bidder who should be assigned objects, the auctioneer further determines which type(s) of objects should be assigned to such bidder. This is done by determining for each type of object, separately, whether the sum of the quantities bid for this type of object by all the other bidders is less than the sum of the quantities being auctioned. In other words, there is at least one object of this type which is desired by only one bidder. Those objects, of those types, are then assigned to that bidder, obligating that bidder to transact them at the prices standing for those types of objects at that time. (If more than one possible assignment vector to that bidder is consistent with this rule, then the auctioneer is permitted to select his most-preferred assignment vector consistent with this rule.) If any objects remain unassigned, the auctioneer announces a new price vector and the auction continues.

Certain constraints are desirable in order for this auction to operate optimally and to reach an economically efficient outcome. One exemplary constraint is an activity rule which constrains a bidder not to increase his quantity, summed over the m types of objects, from one round to the next. Another exemplary constraint is a more stringent activity rule which constrains a bidder not to increase his quantity, individually on each of the m types of objects, from one bid or one round to the next. A third exemplary constraint is a reduction rule which constrains a bidder not to decrease his quantity, for any single type of object, beyond the point where the sum of the quantities bid for this type of object by all bidders equals the sum of the quantities being auctioned. (If, in a given round, two or more bidders, simultaneously attempt to decrease their quantities, for any single type of object, having the effect of reducing bids beyond the point where the sum of the quantities bid for this type of object by all bidders equals the sum of the quantities being auctioned, the auction procedure will resolve this discrepancy. For example, the auctioneer may honor these attempts to decrease in order of time priority, or may ration these simultaneous attempts to decrease in proportion to the attempted reductions.)

While an auction following these rules could be conducted manually, computerized conduct of the auction allows the auction to be conducted with all bidding information taken into account, while controlling the degree to which the information itself is disclosed to the participants. Computerized conduct of the auction also allows the auction to be conducted swiftly and reliably, even if bidders are not located on-site. The amount of information which is transmitted to the bid entry terminals and/or actually displayed to the bidders may be carefully controlled. In one embodiment, all bidding information is displayed to the bidders. In another embodiment, no bidding information is displayed to the bidders; only the results of the auction are displayed. A number of intermediate embodiments are also possible, in which some but not all bidding information is displayed to the bidders. For example, in one preferred embodiment, the auctioneer disclose only the aggregate quantity bid for each type of object in each round, as opposed to disclosing each individual bid.

My prior patent 6,026,383 treats auctions for multiple, identical objects and close substitutes. The earlier application's alternative auction—which may be viewed as a special case of the current auction design—exploited features of the homogeneous-good environment to construct an eminently-simple dynamic procedure. Unfortunately, the cases of multiple types of objects, or objects with complex possibilities for substitution, do not lend themselves to quite as simple a procedure. My other prior patents, "Computer Implemented Methods and Apparatus for Auctions," U.S. Pat. No. 5,905,975, issued 18 May 1999, and U.S. Pat. No. 6,021,398, issued 1 Feb 2000, describe other auction designs for multiple, dissimilar objects. However, the current auction design appears likely in practice to be simpler and to run more swiftly, as well as placing lower computational demands on bidders.

The present invention generalizes my auction design described in U.S. Pat. No. 6,026,383 to treat—in a simple way—the case of auctioning a set of items which includes two (or more) items that are neither identical nor perfect substitutes to one another. Henceforth, this will be described for short as a situation with "multiple types of multiple objects," or simply "heterogeneous items" or "heterogeneous objects." Often, but not always, the heterogeneous items auctioned together will bear some relationship to one another: for example, they may be licenses or rights to perform essentially the same activity at different geographic locations; or they may be securities issued by the same entity but with different durations to maturity; or they may be related goods with slightly different characteristics that render them only imperfect substitutes.

The present invention may also be better suited than previous auction designs for treating the case of identical objects or perfect substitutes which exhibit "increasing returns" for bidders. "Increasing returns" refers to a situation where the extra value that a bidder derives from an $(N+1)^{st}$ unit is greater than the extra value that a bidder derives from an $N^{th}$ unit. For example, this would include a situation where the utility from two units is strictly more than double the utility derived from one unit.

The present invention is useful for conducting auctions involving objects offered for sale by the bidders, as well as objects offered for sale to the bidders. Although terms such as "vector of quantities demanded" (by a bidder) and "demand curve" (of a bidder) are used to describe the present invention, the terms "vector of quantities offered" (by a bidder) and "supply curve" (of a bidder) are equally applicable. In some cases, this is made explicit by the use of both terms, or by the use of the terms "vector of quantities transacted" (by a bidder) and "transaction curve" (of a bidder). The term "quantities transacted" includes both "quantities demanded" and "quantities offered". The term "bid" includes both offers to sell and offers to buy. The term "transaction curve" includes both "demand curve" and "supply curve". Moreover, any references to "quantities being offered" includes both "quantities being sold" by the auctioneer, in the case this is an auction for selling objects, as well as "quantities being brought or procured" by the auctioneer, in the case this is an auction for buying objects or procuring objects.

Moreover, while standard auctions to sell typically involve ascending prices, the present invention may utilize prices that ascend and/or descend. One useful situation in which the price would be allowed to descend is a procurement auction or "reverse auction," an auction to buy.

Throughout this document, the terms "objects", "items", "units" and "goods" are used essentially interchangeably. The inventive system may be used both for tangible objects, such as real or personal property, and intangible objects, such as telecommunications licenses or electric power. The inventive system may be used in auctions where the auctioneer is a seller, buyer or broker, the bidders are buyers, sellers or brokers, and for auction-like activities which cannot be interpreted as selling or buying. The inventive system may be used for items including, but not restricted to, the following: public-sector bonds, bills, notes, stocks, and other securities or derivatives; private-sector bonds, bills, notes, stocks, and other securities or derivatives; communication licenses and spectrum rights; clearing, relocation or other rights concerning encumbrances of spectrum licenses; electric power and other commodity items; rights for terminal, entry, exit or transmission capacities or other rights in gas pipeline systems; airport landing rights; emission allowances and pollution permits; and other goods, services, objects, items or other property, tangible or intangible. It may be used in initial public offerings, secondary offerings, and in secondary or resale markets.

The communication system used, if any, can be any system capable of providing the necessary communication and includes for example a local or wide area network such as for example ethernet, token ring, or alternatively a telephone system, either private or public, the Internet, the Worldwide Web or the information superhighway.

BRIEF DESCRIPTION OF THE DRAWINGS

FIGS. 4a, 4b, and 5 are more detailed flow diagrams illustrating, in more detail, elements of the diagram of FIG. 3;

DETAILED DESCRIPTION OF PREFERRED EMBODIMENTS

The drawings of FIGS. 1–4 of my prior patent 6,026,383 and of FIGS. 1–12 of my patent 5,905,975, and the associated text, provide a general superstructure for the present auction method and system, especially as it relates to the computer implementation thereof. Moreover, the terminology established in the previous applications will be relied upon as needed. The following description will detail the flow of the novel features of the preferred embodiments of the present method and system for an efficient dynamic auction for multiple types of multiple objects.

Figure 1:
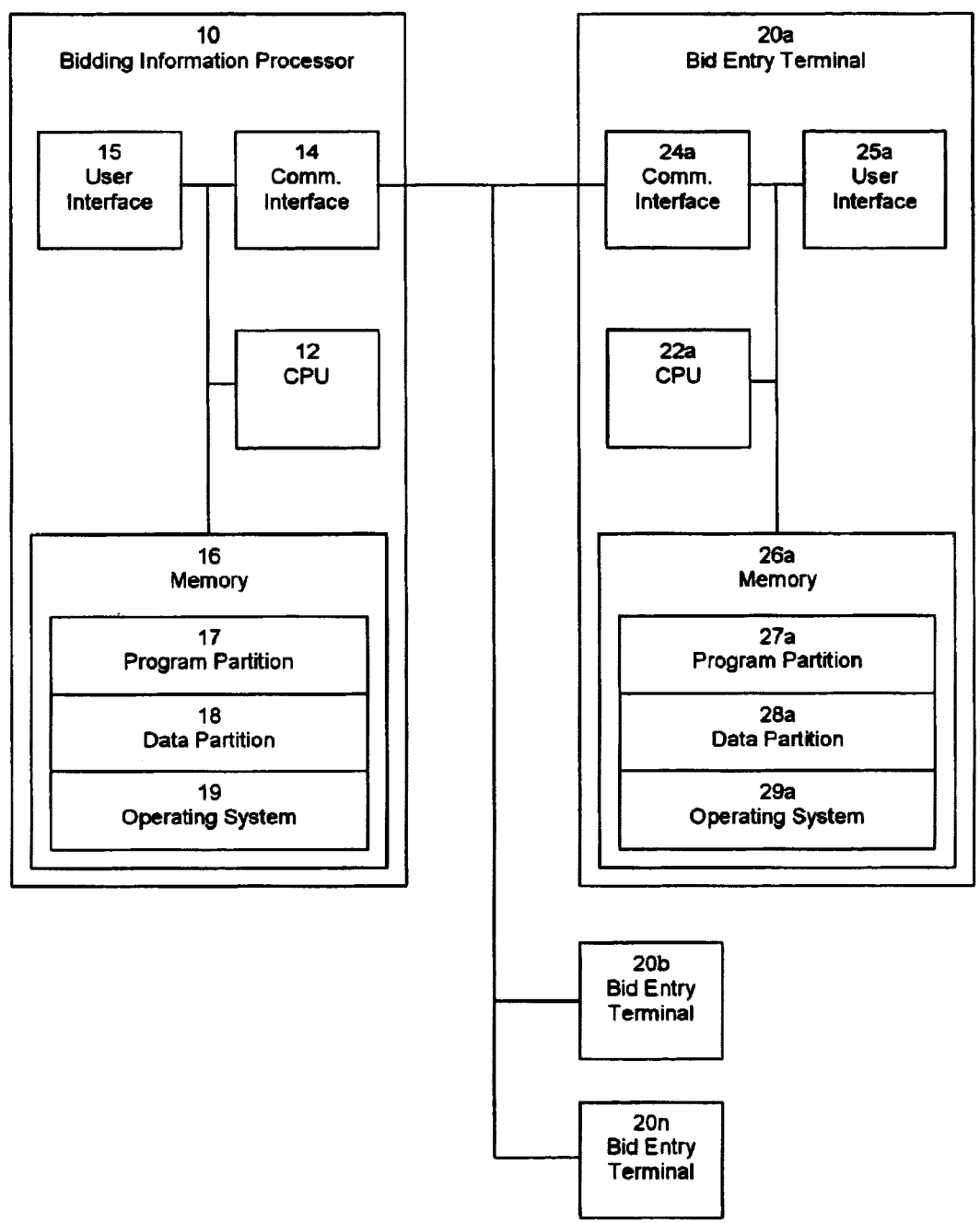
FIG. 1 is an exemplary block diagram of an auction system in accordance with the invention.

Before describing how the auction process is implemented, reference is made to FIG. 1 to describe an exemplary block diagram of one embodiment of the a system in accordance with the present invention. As illustrated in FIG. 1, the auction system includes an auctioneer's system 10 (sometimes also referred to as a Bidding Information Processor or BIP) and a plurality of user systems 20a, 20b and so on (sometimes also referred to as Bid Entry Terminal or BET), each user system 20a, etc. represents an individual bidder. The systems 10–20n are communicatively interconnected via a communication system represented by the illustrated connections. The communication system can represent any system capable of providing the necessary communication to/from BIP and BET and includes for example a local or wide area network such as for example ethernet, token ring, or alternatively a telephone system, either private or public, the internet, the worldwide web or the information superhighway. Each of the systems 10–20n includes a typical user interface 15, 25a for input/output and can include a conventional keyboard, display, and other conventional I/O devices. Within each of the systems, the user interface (15, 25a, etc.) is coupled to a communication interface (14, 24a, etc.) which is in turn connected to the communication system. Both the user interface and communication interface are also connected, at each system, to a CPU (12, 22a, etc.). Each system includes a memory (16, 26a, etc.) which can further be broken down into a program partition (17, 27a, etc.), a data partition (18, 28a, etc.) and an operating system partition (19, 29a, etc.). In each system the CPU (12, 22a, etc.) represents a source of intelligence when executing instructions from the memory (16, 26a, etc.) so that appropriate input/output operations via the user interface and the communications interface take place as is conventional in the art. The particular steps used in implementing the inventive auction system are described in more detail below. In one embodiment, each of the systems are personal computers or workstations.

Figure 2:
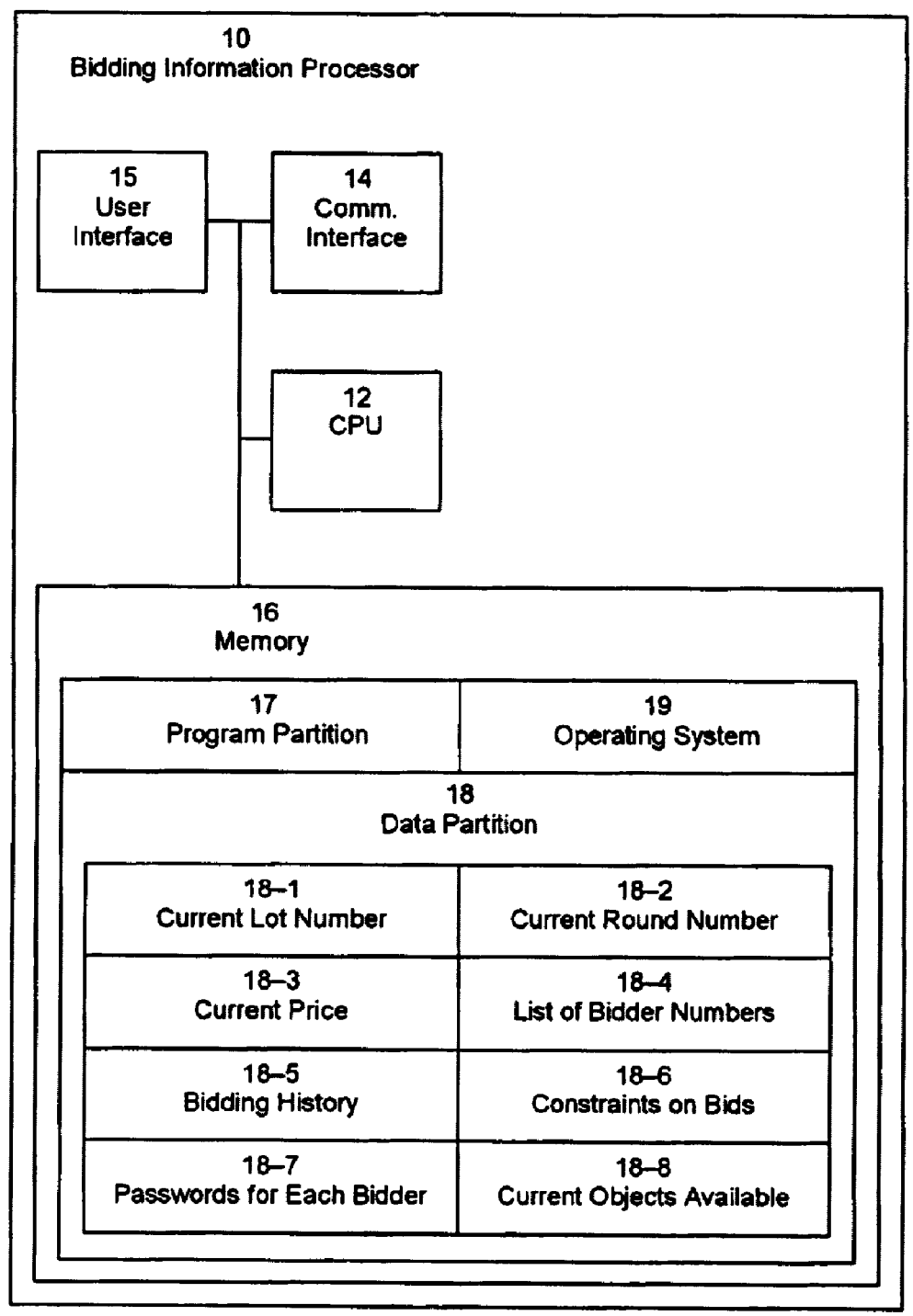
FIG. 2 is a detail of one element of the system of FIG. 1.

FIG. 2 is a more detailed illustration of an exemplary EIP 10 showing details of the data partition 18. As seen in FIG. 2 the data partition includes provision for creating, storing, processing and outputting values representing Current Lot Number 18-1, Current Round Number 18-2, Current Price 18-3, List of Bidder Numbers 18-4, Bidding History 18-5, Constraints on Bids 18-6, Passwords 18-7 and Current Objects Available 18-8. The particular set of data required for any particular auction and the format of that datum or data (such as scalar, vector, list, etc.) is more particularly specified by the detailed description of that auction.

Embodiments Concerned with Complex Possibilities for Substitution

Some of the simplest embodiments of the present invention apply in situations where the possibilities for substitution among the heterogeneous items can be expressed as a matrix. Henceforth, the term "requirements matrix" will refer to a matrix of rows and columns which expresses the possibilities for substitution among the heterogeneous goods, the seller(s) or the buyer(s). The same information could be equivalently expressed as a graph.

For example, one embodiment of the present invention has useful application in the allocation of capacity for a gas pipeline system. Let Types 1–4 denote four geographically-dispersed terminals where gas may enter the pipeline system. The party on whose behalf the auction is conducted may wish to purchase 100 units of entry rights in aggregate. However, it may be the case that: 40 of these units are required to be of Type 2, since 40 units of gas are produced at a field that is located in close geographic proximity to the terminal corresponding to Type 2; 35 of these units are required to be of Types 3 or 4, since 35 units of gas are produced at fields that are located in close geographic proximity to the terminals corresponding to Types 3 and 4; while the remaining 25 units can be of any Types 1–4, since 25 units of gas are brought in by ship and can be landed equally easily at any of these terminals. This situation is depicted by the requirements matrix in Table 1:

TABLE 1

Units required $$\begin{matrix} \text{Type 1} \\ \text{Type 2} \end{matrix} \begin{pmatrix} 1 & 1 & 1 & 1 \\ 0 & 0 & 0 & 1 \end{pmatrix}$$

A second embodiment of the invention treats a situation where there are three types of items (m=3)—Type 1, Type 2 and Type 3—being sold. The party on whose behalf the auction is conducted may wish to sell fixed quantities of these three individual types of items. However, it may still be the case that it is advantageous to sell them together, since bidders may find: that information revealed in the auction about one type of these items is relevant to the value of another type of these items; or that they are relatively more interested in one type of these items, or another, depending upon their relative prices. This situation is depicted by the requirements matrix in Table 2:

TABLE 2

Units required $$\begin{matrix} \text{Type 1} \\ \text{Type 2} \end{matrix} \begin{pmatrix} 1 & 1 & 1 & 1 \\ 0 & 0 & 0 & 1 \end{pmatrix}$$

One useful application of this second embodiment occurs in the context of selling Treasury or other securities. A government or central bank may wish to simultaneously auction 3-month, 6-month and 12-month Treasury securities. Let us denote these three types of Treasury securities as Type 1, Type 2 and Type 3, respectively. The requirements matrix of Table 2 would say that the government or central bank has 2000 units of 3-month Treasury securities, 2000 units of 6-month Treasury securities, and 1000 units of 12-month Treasury securities.

A third, and mathematically simpler, embodiment of the present invention treats the situation where two types of items (m=2)—Type 1 and Type 2—are being procured. The party on whose behalf the auction is conducted may wish to purchase four units in aggregate. However, it may be the case that three of these units are required to be of Type 1, while the fourth unit can either be of Type 1 or Type 2. This situation is depicted by the requirements matrix in Table 3:

TABLE 3

Units required $$\begin{pmatrix} \text{Type 1} \\ \text{Type 2} \end{pmatrix} \begin{pmatrix} 1 & 1 & 1 & 1 \\ 0 & 0 & 0 & 1 \end{pmatrix}$$

One useful application of this third embodiment of the invention may occur in the clearing or relocation of television stations. For example, to clear the communications spectrum currently occupied by UHF Channels 59–69 in a given regional market, it might be necessary to relocate three analog and one digital television stations to lower channels. Let Type 1 denote an analog television station and let Type 2 denote a digital television station. Suppose that an analog station in UHF Channels 59–69 must be relocated to a frequency allocated to analog stations below Channel 59, while a digital station in UHF Channels 59–69 may be relocated to a frequency allocated to either an analog or a digital station below Channel 59. Then the requirements matrix of Table 3 would accurately describe the possibilities for substitution. In particular, the party on whose behalf the auction is held would be satisfied by purchasing four items of Type 1 or by purchasing three items of Type 1 and one item of Type 2. Generally speaking, since this is a procurement auction, this party would prefer whichever of these purchases cost less money.

DEFINITIONS

The available quantity $(\overline{Q}_1, \ldots, \overline{Q}_m)$ refers to the quantity of each type of item offered for sale in the auction, in the case of an auction to sell, and the quantity of each type of item offered to be procured in the auction, in the case of an auction to buy (i.e., a reverse auction). Optionally, the available quantity may be allowed to depend on the price, or otherwise be contingent on the progress of the auction.

The bidding state consists of the current bids $\{Q_1^i, \ldots, Q_m^i\}_{i=1}^n$ of all the bidders, the available quantity, and the quantity vectors (if any) that have already been awarded to bidders. Optionally, bids may be permitted to be more complicated than merely a vector of quantities: for example, bids may be permitted to include prices or to be contingent on events, to contain "and" and "or" restrictions, and to include minimum acceptable quantities. Bids may also be permitted to specify arbitrary sets, or combinations of sets, of specifically-identified objects, as opposed to merely comprising quantities of types of objects.

The set of feasible assignments given the bidding state is the set of all possible allocations $\{x_1^i, \ldots, x_m^i\}_{i=1}^n$ of the available quantity of the m types of items to the n bidders, subject to satisfying all the constraints on the assignment of the goods, the constraints on the bidding process and the constraints posed by the bidding state. The following con ditions (i)–(iv) are exemplary of the requirements on $\{x_1^i, \ldots, x_m^i\}_{i=1}^n$ to be a feasible assignment:

(i) $x_k^i \geq 0$ for every k=1, . . . , m, and for every i=1, . . . , n;

(ii) $\sum_{i=1}^{n} x_k^i = \overline{Q}_k$;

(iii) $\{x_1^i, \ldots, x_m^i\}_{i=1}^n$ is consistent with the requirements matrix or other constraints on the assignment of the items;

(iv) $\{x_1^i, \ldots, x_m^i\}_{i=1}^n$ is consistent with activity rules constraining the bidding process, given current bids $\{Q_1^i, \ldots, Q_m^i\}_{i=1}^n$ (e.g., $x_k^i \leq Q_k^i$ for every k=1, . . . , m, and for every i=1, . . . , n).

The winning set of bidder i is the set $W^i$ of all $(x_1^i, \ldots, x_m^i)$ that are part of a feasible assignment (i.e., the set of feasible assignments for all bidders, projected onto bidder i).

We will write that a quantity vector $(a_1, \ldots, a_m) \geq (b_1, \ldots, b_m)$, if $a_k \geq b_k$ for every k=1, . . . , m, and if $a_k > b_k$ for some k=1, . . . , m.

A quantity vector $(q_1^i, \ldots, q_m^i)$ is said to be minimal in the winning set of bidder i if $(q_1^i, \ldots, q_m^i) \in W^i$ but $(r_1^i, \ldots, r_m^i) \notin W^i$ whenever $(q_1^i, \ldots, q_m^i) \geq (r_1^i, \ldots, r_m^i)$.

A bidder i is said to have clinched a quantity vector $(q_1^i, \ldots, q_m^i)$ if, given the available quantity, his opponents' bids and the various constraints on the auction, the bidder is mathematically guaranteed to win at least the quantity vector $(q_1^i, \ldots, q_m^i)$. In the above notation, bidder i clinches a quantity vector $(q_1^i, \ldots, q_m^i)$ if $(q_1^i, \ldots, q_m^i) \geq 0$ and if $(q_1^i, \ldots, q_m^i)$ is minimal in the winning set of bidder i.

The definition of clinching can be restated in simpler form in general set notation. Let $\Omega$ denote the set of available objects. An assignment is defined to be an n-tuple of subsets, $\{S^i\}_{i=1}^n$, where $S^i$ denotes the subset of objects assigned to bidder i. A feasible assignment is an n-tuple of subsets, $\{S^i\}_{i=1}^n$, with the properties that: $\{S^i\}_{i=1}^n$ assigns every available object to exactly one bidder (i.e., the set union of $\{S^i\}_{i=1}^n$ equals $\Omega$, and the $\{S^i\}_{i=1}^n$ are pairwise disjoint); $\{S^i\}_{i=1}^n$ is consistent with the requirements matrix or other constraints on the assignment of the objects; and $\{S^i\}_{i=1}^n$ is consistent with any activity rules constraining the bidding process, given the current bidding state. The winning set of bidder i is the set $W^i$ of all subsets of objects, $S^i$, that are assigned to bidder i in some feasible assignment (i.e., the set of feasible assignments for all bidders, projected onto bidder i). A subset $S^i$ of objects is said to be minimal in the winning set of bidder i if $S^i \in W^i$, but $R^i \notin W^i$ whenever $R^i$ is a strict subset of $S^i$ (i.e., there is no strict subset of $S^i$ that is feasible for bidder i to win). Analogous to the previous paragraph, bidder i clinches a subset $S^i$ of objects if $S^i \neq \emptyset$ (i.e., $S^i$ is a nonempty set of objects) and $S^i$ is minimal in the winning set of bidder i.

A second, almost equivalent way of describing clinching is that the quantity vector $(q_1^i, \ldots, q_m^i)$ is clinched if it constitutes a maximal quantity vector that bidder i is guaranteed to win. The quantity vector $(q_1^i, \ldots, q_m^i)$ is a maximal quantity vector that bidder i is guaranteed to win if: bidder i is guaranteed to win $(q_1^i, \ldots, q_m^i)$; but these does not exist any quantity vector $(r_1^i, \ldots, r_m^i) \geq (q_1^i, \ldots, q_m^i)$ such that bidder i is guaranteed to win the quantity vector $(r_1^i, \ldots, r_m^i)$.

A third, and apparently equivalent way of describing clinching is in terms of admissible fictitious bids. We will say that $(\tilde{Q}_1^i, \ldots, \tilde{Q}_m^i)$ is an admissible fictitious bid if the following three conditions are all satisfied:

(i) $0 \leq \tilde{Q}_k^i \leq Q_k^i$, for every $k=1, \ldots, m$;

(ii) $\tilde{Q}_k^i > 0$, for some $k=1, \ldots, m$; and (iii) $\tilde{Q}^i$ satisfies any extra requirements of the auction such as consisting entirely of integer numbers.

For any Bidder i and for any fictitious bid $\tilde{Q}^i$ under consideration, the computer determines an answer to the following question: "If Bidder i's actual bid $(Q_1^i, \ldots, Q_m^i)$ were replaced by the admissible fictitious bid $(\tilde{Q}_1^i, \ldots, \tilde{Q}_m^i)$, and if the other bidders continued to use their actual bids, would the auction conclude?" If the answer to this question is affirmative, then Bidder i can also be viewed as having guaranteed winning the units $(Q_1^i - \tilde{Q}_1^i, \ldots, Q_m^i - \tilde{Q}_m^i)$. The auction procedure takes note of this determination in assigning objects.

The principles underlying "clinching"—and the algorithm determining "clinching"—are easiest illustrated with some examples:

EXAMPLE 1

The requirements matrix for units of each of the two types is given by Table 3. The auction is conducted as a procurement auction, and four bidders (superscripted by i=1, 2, 3, 4) participate. At every price p, each bidder i indicates a pair $(Q_1^i, Q_2^i)$, which gives the number of units of Type 1 and the number of units of Type 2, respectively, that he is willing to sell at price p. Suppose that, for a given price p, the following Table 4A shows the quantities that the bidders have indicated:

TABLE 4A

|  | $Q_1^i$ | $Q_2^i$ |
|---|---|---|
| Bidder 1 | 2 | 0 |
| Bidder 2 | 1 | 0 |
| Bidder 3 | 0 | 1 |
| Bidder 4 | 1 | 0 |

To begin, observe that the auction has not yet concluded, and that the auctioneer may continue by naming a new, lower price. The reason for this observation is that the party on whose behalf the auction is being conducted only wishes to purchase either 3 units of Type 1 and 1 unit of Type 2, or 4 units of Type 1 (see Table 3), whereas Bidders 1–4 are in aggregate offering 4 units of Type 1 and 1 unit of Type 2 (i.e., strictly more than is required). However, suppose we take any Bidder i (i=1, 2, 3, 4) and consider the following question: "Are there any types of any units that Bidder i is already guaranteed to have won (given other bidders' bids)?" If the answer to this question is affirmative, then Bidder i will be said to have clinched such units.

In Example 1, let us begin by considering Bidder 1. Since Bidder 1 is only bidding on units of Type 1, Bidder 1 can only clinch units of Type 1. Observe that any feasible way of satisfying the requirements matrix includes Bidder 1 winning on at least 1 unit of Type 1. (This follows from the fact that, in the requirements matrix of Table 3, at least 3 units of Type 1 are required, but Bidders 2–4 are collectively bidding only 2 units of Type 1.) Thus, Bidder 1 has clinched one unit of Type 1. One way that the auctioneer may act on this determination is to assign one unit of Type 1 to Bidder 1 at the price associated with the first time that Bidder 1 was determined to have clinched one unit of Type 1.

At the same time, observe that one feasible way of satisfying the requirements matrix is using the following bids: $(Q_1^1, Q_2^1)=(1,0)$; $(Q_1^2, Q_2^2)=(1,0)$; $(Q_1^3, Q_2^3)=(0,1)$; and $(Q_1^4, Q_2^4)=(1,0)$. Since this feasible way of satisfying the requirements matrix has Bidder 1 winning only one unit of Type 1, we conclude that Bidder 1 has not clinched two units of Type 1.

To put things slightly differently, but equivalently, the winning set for Bidder 1 in Example 1 is $W^1 = \{(1,0), (2,0)\}$. There is no feasible assignment in which Bidder 1 is assigned (0,0). Thus, (1,0) is minimal in the winning set, $W^1$, of Bidder 1, and so Bidder 1 clinches the quantity vector (1,0). Put differently, if Bidder 1's actual bid of (2,0) were replaced by the admissible fictitious bid (1,0), then the auction would end; thus, Bidder 1 clinches the difference $(2,0)-(1,0)=(1,0)$.

Also at the same time, observe that Bidders 2–4 have not yet clinched any units. The requirements matrix can be satisfied using the bids: $(Q_1^1, Q_2^1)=(2,0)$; $(Q_1^2, Q_2^2)=(0,0)$; $(Q_1^3, Q_2^3)=(0,1)$; and $(Q_1^4, Q_2^4)=(1,0)$. This does not involve Bidder 2 winning anything at all. The requirements matrix can also be satisfied using the bids: $(Q_1^1, Q_2^1)=(2,0)$; $(Q_1^2, Q_2^2)=(1,0)$; $(Q_1^3, Q_2^3)=(0,0)$; and $(Q_1^4, Q_2^4)=(1,0)$. This does not involve Bidder 3 winning anything at all. Finally, the requirements matrix can also be satisfied using the bids: $(Q_1^1, Q_2^1)=(2,0)$; $(Q_1^2, Q_2^2)=(1,0)$; $(Q_1^3, Q_2^3)=(0,1)$; and $(Q_1^4, Q_2^4)=(0,0)$. This does not involve Bidder 4 winning anything at all.

EXAMPLE 2

The requirements matrix for units of each of the two types is again given by Table 3. The auction is conducted as a procurement auction, and four bidders (superscripted by i=1, 2, 3, 4) participate. At every price p, each bidder i indicates a pair $(Q_1^i, Q_2^i)$ which gives the number of units of Type 1 and the number of units of Type 2, respectively, that he is willing to sell at price p. Suppose that, for a given price p, the following Table 4B shows the quantities that the bidders have indicated:

TABLE 4B

|  | $Q_1^i$ | $Q_2^i$ |
|---|---|---|
| Bidder 1 | 1 | 1 |
| Bidder 2 | 1 | 0 |
| Bidder 3 | 0 | 1 |
| Bidder 4 | 1 | 0 |

To begin, observe that the auction has not yet concluded, and that the auctioneer may continue by naming a new, lower price. The reason for this observation is that the party on whose behalf the auction is being conducted only wishes to purchase either 3 units of Type 1 and 1 unit of Type 2, or 4 units of Type 1 (see Table 3), whereas Bidders 1–4 are in aggregate offering 3 units of Type 1 and 2 units of Type 2 (i.e., strictly more than is required).

In Example 2, let us begin by considering Bidder 1. Since Bidder 1 is bidding on units of Type 1 and Type 2. Bidder 1 can in principle clinch units of Type 1 or Type 2. Observe that any feasible way of satisfying the requirements matrix includes Bidder 1 winning 1 unit of Type 1. (This follows from the fact that, in the requirements matrix of Table 3, at least 3 units of Type 1 are required, but Bidders 2–4 are collectively bidding only 2 units of Type 1.) Thus, Bidder 1 has clinched one unit of Type 1. One way that the auctioneer may act on this determination is to assign one unit of Type 1 to Bidder 1 at the price associated with the first time that Bidder 1 was determined to have clinched one unit of Type 1.

Bidders 2 and 4 have also clinched one unit of Type 1. (For Bidder 2, this follows from the fact that, in the requirements matrix of Table 3, at least 3 units of Type 1 are required, but Bidders 1, 3 and 4 are collectively bidding only 2 units of Type 1.) (For Bidder 4, this follows from the fact that, in the requirements matrix of Table 3, at least 3 units of Type 1 are required, but Bidders 1, 2 and 3 are collectively bidding only 2 units of Type 1.) One way that the auctioneer may act on this determination is to assign one unit of Type 1 to Bidder 2 at the price associated with the first time that Bidder 2 was determined to have clinched one unit of Type 1, and similarly for Bidder 4.

At the same time, observe that Bidder 1 has not clinched one unit of Type 2. This is because one feasible way of satisfying the requirements matrix is using the following bids: $(Q_1^1, Q_2^1)=(1,0)$; $(Q_1^2, Q_2^2)=(1,0)$; $(Q_1^3, Q_2^3)=(0,1)$; and $(Q_1^4, Q_2^4)=(1,0)$. Since this feasible way of satisfying the requirements matrix has Bidder 1 winning zero units of Type 2, we conclude that Bidder 1 has not clinched any units of Type 2.

Also at the same time, observe that Bidder 3 has not yet clinched any units. The requirements matrix can be satisfied using the bids: $(Q_1^1, Q_2^1)=(1,1)$; $(Q_1^2, Q_2^2)=(1,0)$; $(Q_1^3, Q_2^3)=(0,0)$; and $(Q_1^4, Q_2^4)=(1,0)$. This does not involve Bidder 3 winning anything at all.

EXAMPLE 3

Let the requirements matrix for units of each of three types now be given by Table 2. The auction is conducted as a selling auction, and four bidders (superscripted by i=1, 2, 3, 4) participate. At every price vector $(p_1, p_2, p_3)$, each bidder i indicates a vector $(Q_1^i, Q_2^i, Q_2^i)$, which gives the number of units of Type 1 that he is willing to purchase at price $p_1$, the number of units of Type 2 that he is willing to purchase at price $p_2$, and the number of units of Type 3 that he is willing to purchase at price p. Suppose that, for a given price vector $(p_1, p_2, p_3)$ the following Table 5 shows the quantities that the bidders have indicated:

TABLE 5

|  | $Q_1^i$ | $Q_2^i$ | $Q_3^i$ |
| --- | --- | --- | --- |
| Bidder 1 | 1000 | 0 | 500 |
| Bidder 2 | 500 | 1000 | 100 |
| Bidder 3 | 500 | 1000 | 200 |
| Bidder 4 | 500 | 0 | 600 |

We might also suppose that, as the auction continues, each bidder is only allowed to bid the same quantity or lower on each type of item.

To begin, observe that the auction has not yet concluded on Type 1 and Type 3, and that the auctioneer may continue by naming a new, higher prices $p_1$ and $p_3$. The reason for this observation is that the party on whose behalf the auction is being conducted only wishes to sell 2000 units of Type 1, whereas Bidders 1–4 are in aggregate demanding 2500 units of Type 1 (i.e., strictly more than is required), and the party on whose behalf the auction is being conducted only wishes to sell 1000 units of Type 3, whereas Bidders 1–4 are in aggregate demanding 1400 units of Type 3 (i.e., strictly more than is required).

In Example 3, since the requirements matrix is a diagonal matrix, one may choose to treat the three types of units separately. Let us begin by considering Type 1. In considering Type 1, let us begin with Bidder 1. Observe that any feasible way of satisfying the requirements matrix includes Bidder 1 winning (at least) 500 units of Type 1. (This follows from the fact that, in the requirements matrix of Table 5, there are 2000 units of Type 1 required, but Bidders 2–4 are collectively bidding only 1500 units of Type 1.) Thus, Bidder 1 has clinched 500 units of Type 1. One way that the auctioneer may act on this determination is to assign units of Type 1 to Bidder 1 at the price associated with the first time that Bidder 1 was determined to have clinched the given unit of Type 1.

At the same time, observe that Bidders 2–4 have not yet clinched any units of Type 1. The requirements for Type 1 can be satisfied using the quantities: $Q_1^1=1000$; $Q_1^2=0$; $Q_1^3=500$; and $Q_1^4=500$. This does not involve Bidder 2 winning any of Type 1 at all. The requirements for Type 1 can also be satisfied using the quantities: $Q_1^1=1000$; $Q_1^2=500$; $Q_1^3=0$; and $Q_1^4=500$. This does not involve Bidder 3 winning any of Type 1 at all. The requirements for Type 1 can also be satisfied using the quantities: $Q_1^1=1000$; $Q_1^2=500$; $Q_1^3=500$; and $Q_1^4=0$. This does not involve Bidder 4 winning any of Type 1 at all.

Turning to Type 2, observe that the auction of Type 2 items has effectively concluded. In clinching terms, Bidders 2 and 3 have each clinched 1000 units of Type 2, and their combined clinches equals the entire requirements of 2000. This follows from the fact that the only feasible way in which the requirements for Type 2 can be satisfied is using the quantities: $Q_2^1=0$; $Q_2^2=1000$; $Q_2^3=1000$; and $Q_2^4=0$.

Turning to Type 3, let us begin by considering Bidder 1. Observe that any feasible way of satisfying the requirements matrix includes Bidder 1 winning (at least) 100 units of Type 3. (This follows from the fact that, in the requirements matrix of Table 2, there are 1000 units of Type 3 required, but Bidders 2–4 are collectively bidding only 900 units of Type 3.) Thus, Bidder 1 has clinched 100 units of Type 3. One way that the auctioneer may act on this determination is to assign units of Type 3 to Bidder 1 at the price associated with the first time that Bidder 1 was determined to have clinched the given unit of Type 3. Let us next consider Bidder 4. Observe that any feasible way of satisfying the requirements matrix includes Bidder 4 winning (at least) 200 units of Type 3. (This follows from the fact that, in the requirements matrix of Table 2, there are 1000 units of Type 3 required, but Bidders 1–3 are collectively bidding only 800 units of Type 3.) Thus, Bidder 4 has clinched 200 units of Type 3. One way that the auctioneer may act on this determination is to assign units of Type 3 to Bidder 4 at the price associated with the first time that Bidder 4 was determined to have clinched the given unit of Type 3.

At the same time, observe that Bidders 2 and 3 have not clinched any units of Type 3. This is because one feasible way in which the requirements for Type 3 can be satisfied is using the quantities: $Q_3^1=400$; $Q_3^2=0$; $Q_3^3=0$; and $Q_3^4=600$. This does not involve Bidder 2 or Bidder 3 winning any of Type 3 at all.

Figure 3:
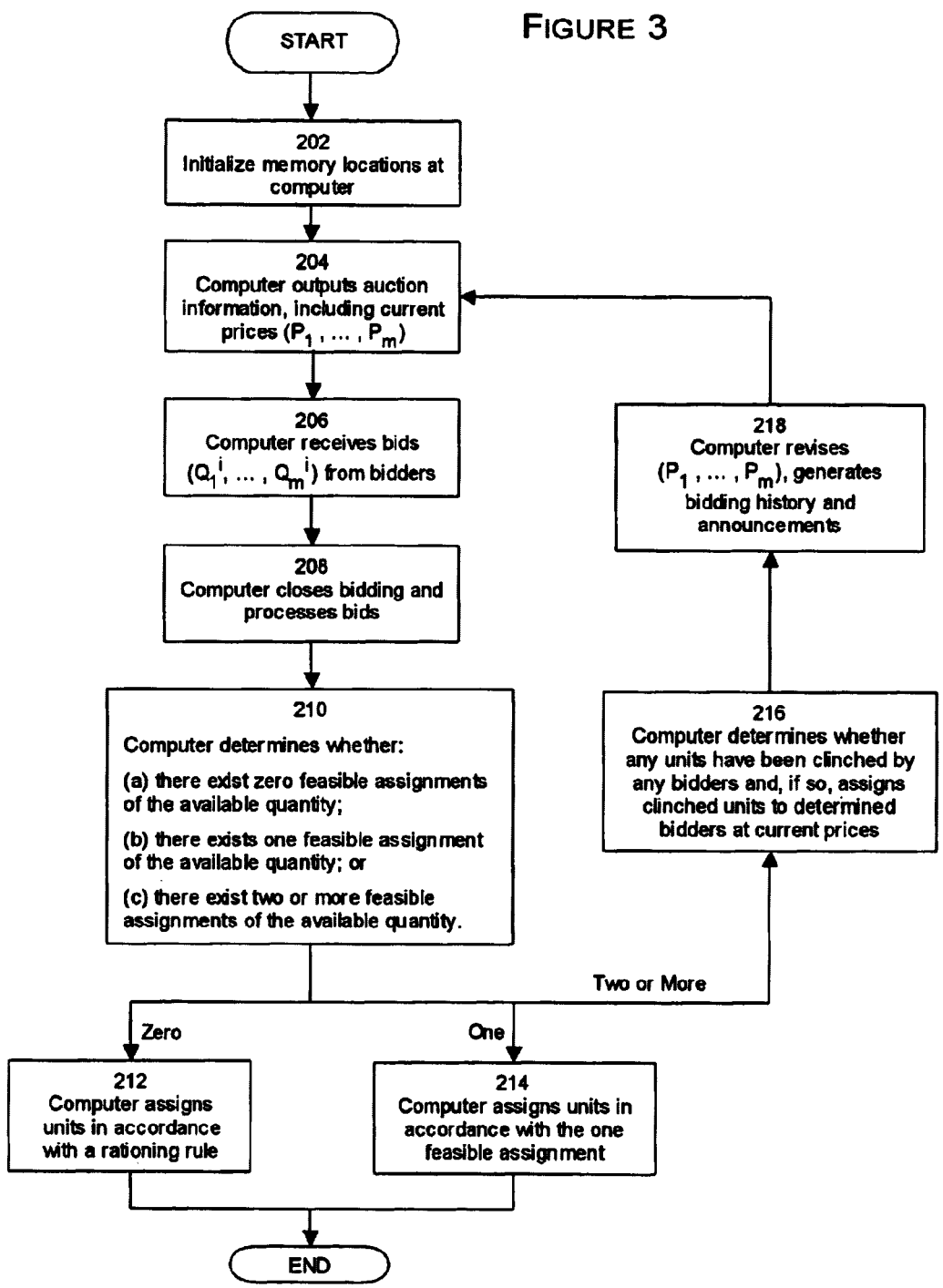
FIG. 3 is a flow diagram of an auction process in accordance with one embodiment of the invention.

FIG. 3 is a flow diagram of an auction process in accordance with one embodiment of the present invention. The process starts with step 202, in which memory locations at the computer are initialized. In step 202, the appropriate memory locations are initialized with information such as the number of types of objects for auction, the quantity of each type of object for auction, and the initial price vector. In step 204, the computer outputs auction information, including the current price vector ($P_1, \ldots, P_m$). In step 206, the computer receives bids ($Q_1^i, \ldots, Q_m^i$) from bidders. In step 208, the computer closes the bidding for the current round and processes bids. This process is shown in more detail in FIG. 5. In step 210, the computer determines whether: (a) there exist zero feasible assignments of the available quantity; (b) there exists one feasible assignment of the available quantity; or (c) there exist two or more feasible assignments of the available quantity. If, at step 210, the computer determines that (c) there exist two or more feasible assignments of the available quantity, then the process goes to step 216 in which the computer determines whether any units have been clinched by any bidders and, if so, assigns clinched units to determined bidders at current prices. This process is shown in more detail in FIG. 4a, and one preferred embodiment of this process is shown in more detail in FIG. 4b. The process then goes to step 218 in which the computer revises the current price vector ($P_1, \ldots, P_m$) and generates the bidding history and any auction announcements and messages. One exemplary rule for revising the price is that, for every k=1, ..., m, the price $P_k$ of objects of type k is raised by $$c\left[\left(\sum_{i=1}^{n} Q_k^{i,t}\right) - \overline{Q}_k\right],$$

where c is a positive constant (i.e., the price for each type is increased in direct proportion to the excess demand for that type). The process then loops to step 204.

If, at step 210, the computer determines that (a) there exist zero feasible assignments of the available quantity, then the process goes to step 212 in which the computer assigns units in accordance with a rationing rule. One exemplary rationing rule is for the computer to honor the various bidders' attempts to decrease their bids by time priority (i.e., in the order that the bids were submitted) so long as a feasible assignment continues to exist. A second exemplary rationing rule is for the computer to increase each bidder's quantity bid in constant proportion to the bidder's most recent attempted reduction, $Q_k^{i,t-1} - Q_k^{i,t}$, until one assignment becomes feasible. If, at step 210, the computer determines that (b) there exists one feasible assignment of the available quantity, then the process goes to step 214 in which the computer assigns units in accordance with the one feasible assignment. After steps 212 or 214, the auction is deemed to have ended, and so the process ends.

Figure 4A:
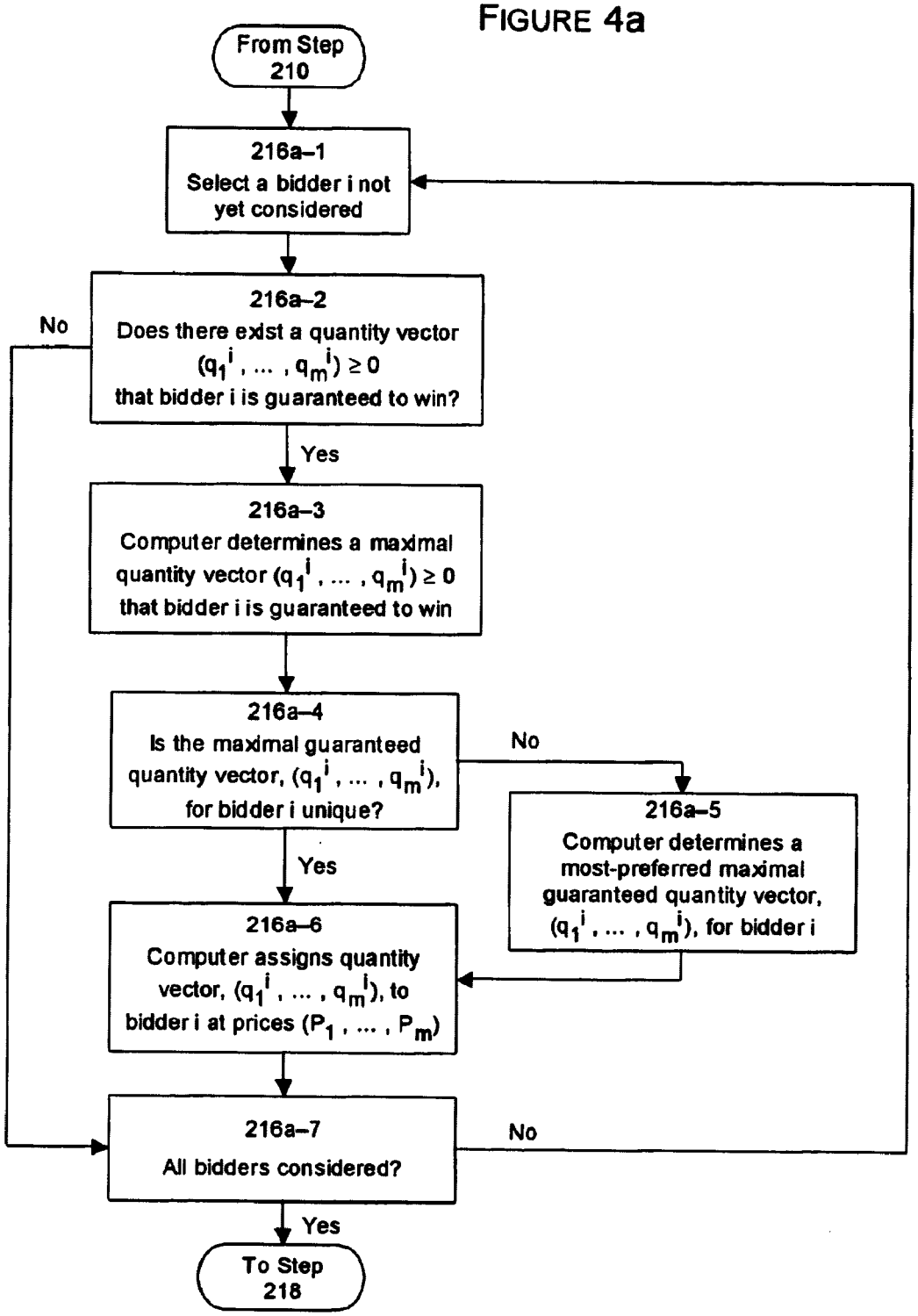

FIG. 4a is a flow diagram of a subprocess of step 216. It begins with step 216a-1, in which a bidder i which has not yet been considered is selected. In step 216a-2, for the bidder i currently being considered, the computer determines whether there exists a quantity vector ($q_1^i, \ldots, q_m^i) \geq 0$ that bidder i is guaranteed to win. If there does not exist such as quantity vector ($q_1^i, \ldots, q_m^i) \geq 0$, the process proceeds directly to step 216a-7. If there does exist such a quantity vector ($q_1^i, \ldots, q_m^i) \geq 0$, the process continues with step 216a-3, in which the computer determines a maximal quantity vector ($q_1^i, \ldots, q_m^i) \geq 0$ that bidder i is guaranteed to win. The quantity vector ($q_1^i, \ldots, q_m^i$) is said to be a maximal quantity vector that bidder i is guaranteed to win (or a maximal guaranteed quantity vector) if: bidder i is guaranteed to win ($q_1^i, \ldots, q_m^i$); but there does not exist any quantity vector ($r_1^i, \ldots, r_m^i) \geq (q_1^i, \ldots, q_m^i$) such that bidder i is guaranteed to win the quantity vector ($r_1^i, \ldots, r_m^i$). The process then continues with step 216a-4, in which the computer determines whether the maximal guaranteed quantity vector ($q_1^i, \ldots, q_m^i) \geq 0$ generated in step 216a-3 is unique. If it is unique, the process proceeds directly to step 216a-6. If it is not unique, the process continues with step 216a-5, in which the computer determines a most-preferred maximal quantity vector ($q_1^i, \ldots, q_m^i$) that bidder i is guaranteed to win. One exemplary way of selecting a most-preferred maximal guaranteed quantity vector that bidder i is guaranteed to win is to calculate a maximal guaranteed quantity vector ($q_1^i, \ldots, q_m^i$) such that the difference between the expected final price vector and the current price vector, multiplied by ($q_1^i, \ldots, q_m^i$) as a dot product, is minimized. In step 216a-6, the computer assigns the determined quantity vector, ($q_1^i, \ldots, q_m^i$), to bidder i at the current price vector ($P_1, \ldots, P_m$). In step 216a-7, the computer determines whether all bidders have been considered. If not, the process loops back to step 216a-1. If all bidders have been considered, the process goes to step 218 of FIG. 3.

FIG. 4b is a flow diagram of one preferred embodiment of the process shown in FIG. 4a. It is also a flow diagram of a subprocess of step 216. It begins with step 216b-1, in which the computer selects a bidder i which has not yet been considered. In step 216b-2, the computer selects a type k which has not yet been considered. In step 216b-3, the computer sums the quantities demanded of the type k objects by all the bidders except bidder i, and compares this sum with the quantity remaining unassigned of type k objects. If the computer determines that the quantity remaining unassigned of type k objects is not strictly greater than the sum of the quantities demanded of the type k objects by all the bidders except bidder i, then the process proceeds directly to step 216b-5. If the computer determines that the quantity remaining unassigned of type k objects is strictly greater than the sum of the quantities demanded of the type k objects by all the bidders except bidder i, then the process continues with step 216b-4. In step 216b-4, the computer assigns the quantity $\overline{Q}_k - \Sigma_{j \neq i} Q_k^i$ or the quantity $Q_k^i$—whichever of the two quantities is smaller—of objects of type k to bidder i. The process then proceeds with step 216b-5, in which the computer determines whether all types have been considered for bidder i. If not, the process loops back to step 216b-2. If all types have been considered for bidder i, the process continues with step 216b-6, in which the computer determines whether all bidders have been considered. If not, the process loops back to step 216b-1. If all bidders have been considered, the process goes to step 218 of FIG. 3.

Figure 5:
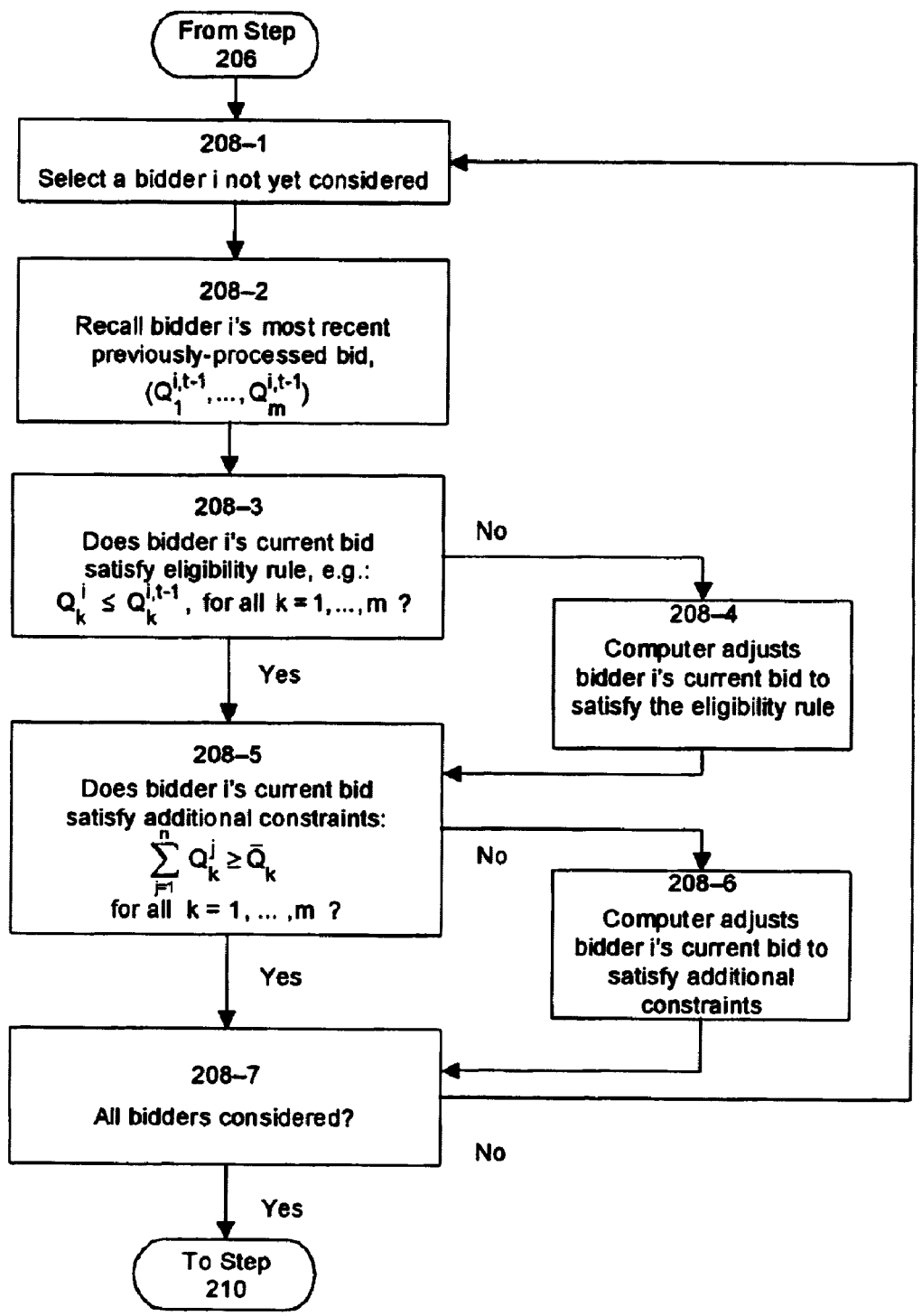

FIG. 5 is a flow diagram of a subprocess of step 208. It begins with step 208-1, in which the computer selects a bidder which has submitted a bid but which has not yet been considered. This bidder is denoted bidder i. One exemplary way of selecting which bidder to consider is to select the earliest-time-stamped bid which has not yet been considered. In step 208-2, the computer recalls from memory the most recent previously-processed bid by bidder i, the bidder currently being considered. The most recent previously-processed bid is denoted ($Q_1^{i,t-1}, \ldots, Q_m^{i,t-1}$). In step 208-3, the computer determines whether bidder i's current bid satisfies an eligibility rule, for example: $Q_k^{i,t} \leq Q_i^{i,t-1}$. If bidder i's current bid satisfies the eligibility rule, then the process skips to step 208-5. If bidder i's current bid does not satisfy the eligibility rule, the process continues with step 208-4, in which the computer adjusts bidder i's current bid so as to satisfy the eligibility rule. One exemplary way of doing this is to insert bidder i's most recent previously-processed bid, ($Q_1^{i,t-1}, \ldots, Q_m^{i,t-1}$), as bidder i's current bid. In step 208-5, the computer determines whether bidder i's current bid satisfies the additional constraints:

$$\sum_{j=1}^{n} Q_k^j \geq \overline{Q}_k,$$

for all types k=1, ..., m. If bidder i's current bid satisfies these additional constraints, then the process skips to step 208-7. If bidder i's current bid does not satisfy these additional constraints, the process continues with step 208-6, in which the computer adjusts bidder i's bid so as to satisfy the additional constraints. One exemplary way of doing this is to insert bidder i's most recent previously-processed bid, $(Q_1^{i,t-1}, \ldots, Q_m^{i,t-1})$, as bidder i's current bid. A second exemplary way of doing this is to substitute $Q_k^i$ with $\overline{Q}^k - \Sigma_{j \neq i} Q_k^j$ as bidder i's quantity for type k, for every k=1, ..., m violating the additional constraint. In step 208-7, the computer determines whether all bidders who have submitted bids have yet been considered. If not, the process loops back to step 208-1. If all bidders have been considered, the process goes to step 210 of FIG. 3.

Figure 6:
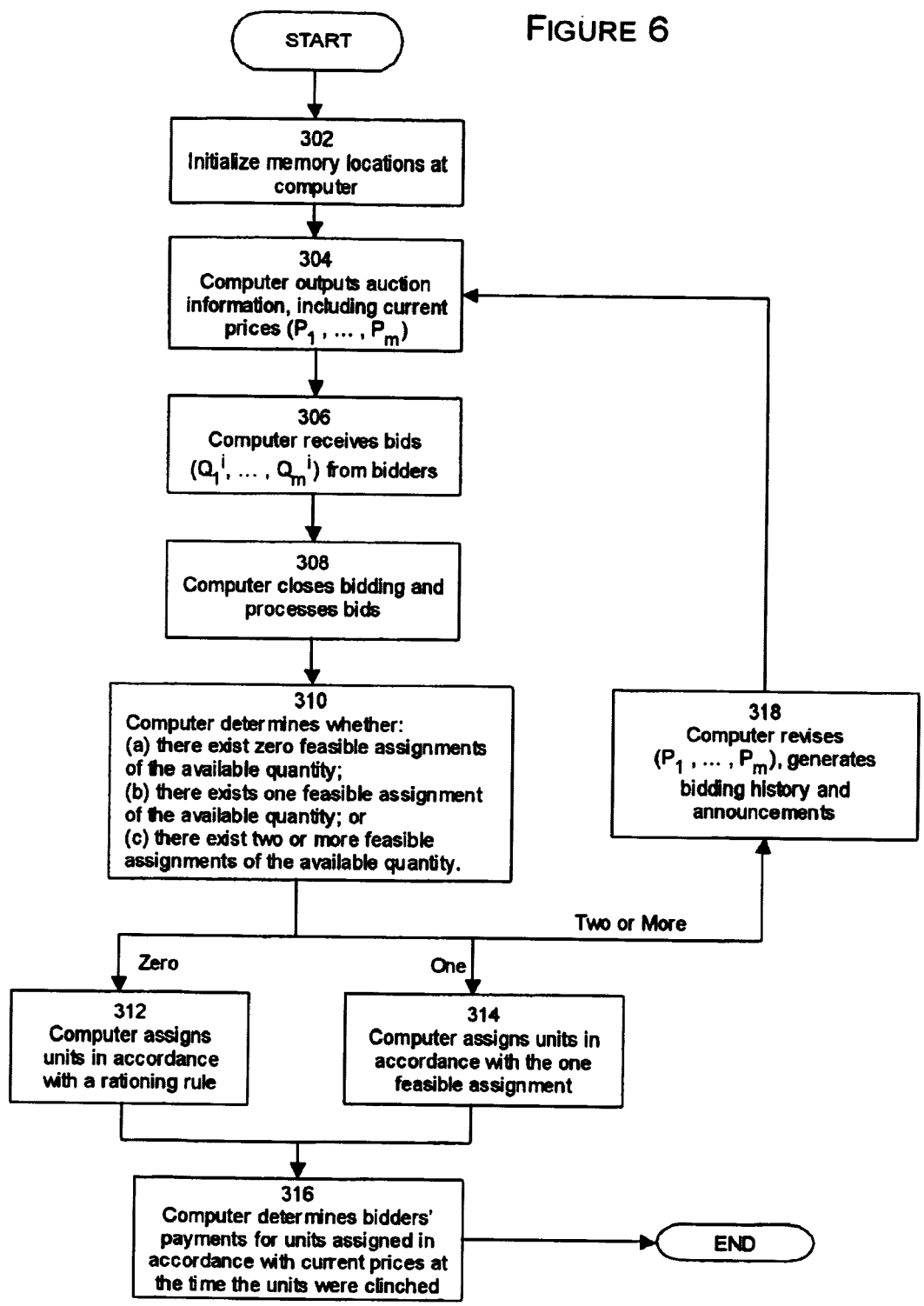
FIG. 6 is a flow diagram of an auction process in accordance with another embodiment of the invention.

Another embodiment of the inventive system is described by a slightly different flow diagram, FIG. 6. The difference between FIG. 3 and FIG. 6 is that—in FIG. 6—the step 316 is deferred until the end of the auction. In that event, the auctioneer is allowed to wait until the conclusion of the auction to determine which objects were assigned at which prices in the course of the auction.

FIG. 6 is thus a flow diagram of an auction process in accordance with another embodiment of the present invention. The process starts with step 302, in which memory locations at the computer are initialized. In step 302, the appropriate memory locations are initialized with information such as the number of types of objects for auction, the quantity of each type of object for auction, and the initial price vector. In step 304, the computer outputs auction information, including the current price vector $(P_1, \ldots, P_m)$. In step 306, the computer receives bids $(Q_1^i, \ldots, Q_m^i)$ from bidders. In step 308, the computer closes the bidding for the current round and processes bids. This process is shown in more detail in FIG. 5 (but with "From Step 206" replaced by "From Step 306", and with "To Step 210" replaced by "To Step 310", etc.). In step 310, the computer determines whether: (a) there exist zero feasible assignments of the available quantity; (b) there exists one feasible assignment of the available quantity; or (c) there exist two or more feasible assignments of the available quantity. If, at step 310, the computer determines that (c) there exist two or more feasible assignments of the available quantity. If, at step available quantity, then the process goes to step 318 in which the computer revises the current price vector $(P_1, \ldots, P_m)$ and generates the bidding history and any auction announcements and messages. One exemplary rule for revising the price is that, for every k=1, ..., m, the price $P_k$ of objects of type k is raised by $$c\left[\left(\sum_{i=1}^{n} Q_k^{i,t}\right) - \overline{Q}_k^t\right],$$

where c is a positive constant (i.e., the price for each type is increased in direct proportion to the excess demand for that type). The process then loops to step 304.

If, at step 310, the computer determines that (a) there exist zero feasible assignments of the available quantity, then the process goes to step 312 in which the computer assigns units in accordance with a rationing rule. One exemplary rationing rule is for the computer to honor the various bidders' attempts to decrease their bids by time priority (i.e., in the order that the bids were submitted) so long as a feasible assignment continues to exist. A second exemplary rationing rule is for the computer to increase each bidder's quantity bid in constant proportion to the bidder's most recent attempted reduction, $Q_k^{i,t-1} - Q_k^{i,t}$ until one assignment becomes feasible. If, at step 310, the computer determines that (b) there exists one feasible assignment of the available quantity, then the process goes to step 314 in which the computer assigns units in accordance with the one feasible assignment. After steps 312 or 314, the process goes to step 316 in which the computer determines bidders' payments for units assigned, retroactively, in accordance with current prices at the time the units were clinched. If, at every time that units were clinched, the maximal quantity vector $(q_1^i, \ldots, q_m^i)$ that bidder i was guaranteed to win was unique, then the determination of payments is straightforward. For the case where the sequence of maximal guaranteed quantity vectors $(q_1^i, \ldots, q_m^i)$ for bidder i was not unique, one exemplary way for the computer to determines bidders' payments is to determine the sequence of maximal guaranteed quantity vectors consistent with the ultimate assignment of units that maximizes bidder i's payment. After step 316, the auction is deemed to have ended, and so the process ends.

Another embodiment of the inventive system is described by the same flow diagrams—except with step 216 or step 316 (and hence FIGS. 4a and 4b) deleted. In that event, the auction still proceeds with multiple ascending clocks, but now objects are not assigned in intermediate rounds, and so every object of a given type is assigned at the same price.

Further Embodiments with Interactions Among Different Types of Units

The embodiments of the present invention that have thus far been discussed in this document have been premised, in their logic, on an activity rule which considered each type of unit separately. Each bidder was constrained to bid a quantity on each type of unit that is no greater than any of his earlier quantities bid on that same type of unit. In notation, $Q_k^{i,t} \leq Q_k^{i,t-1}$, for every k=1, ..., m.

In many applications, it may be advantageous to instead use an activity rule which allows interactions among different types of units. One of the simplest examples is an activity rule for a bidder under which the aggregate quantity bid for all types of units is constrained to be no greater than any of his earlier aggregate quantities bid for all types of units. In notation, $$\sum_{k=1}^{m} Q_k^{i,t} \leq \sum_{k=1}^{m} Q_k^{i,t-1}.$$

Observe that the latter activity rule is a looser constraint on bidders than the former activity rule. For example, in Example 3 (see also Tables 2 and 5), a bid of (500, 0, 600) may be followed by a bid of (600, 300, 100) under the latter activity rule, but not under the former activity rule. Since more possible future bids exist under the latter activity rule, smaller quantities are determined to have clinched at a given bidding state when analyzed under the latter activity rule.

Activity rules that allow interactions among different types of units may be particularly advantageous in applications where substitution among the different types of units are most relevant to bidders. For example, in the application to allocation of capacity for a gas pipeline system, a bidder may be bringing in his gas by ship, and may be able to equally easily use any of four terminals. In that event, all he may really care about is his aggregate quantity summed over the four terminals (adjusted for minor cost differences among the terminals). In the application to selling Treasury securities, a bidder may be looking for a safe short-term investment, and may be able to equally easily use 3-month, 6-month or 12-month Treasury securities. Let us denote these three types of Treasury securities as Type 1, Type 2 and Type 3, respectively. In that event, all he may really care about is his aggregate quantity summed over the three times to maturity (adjusted for price differences on the yield curve).

Figure 7:
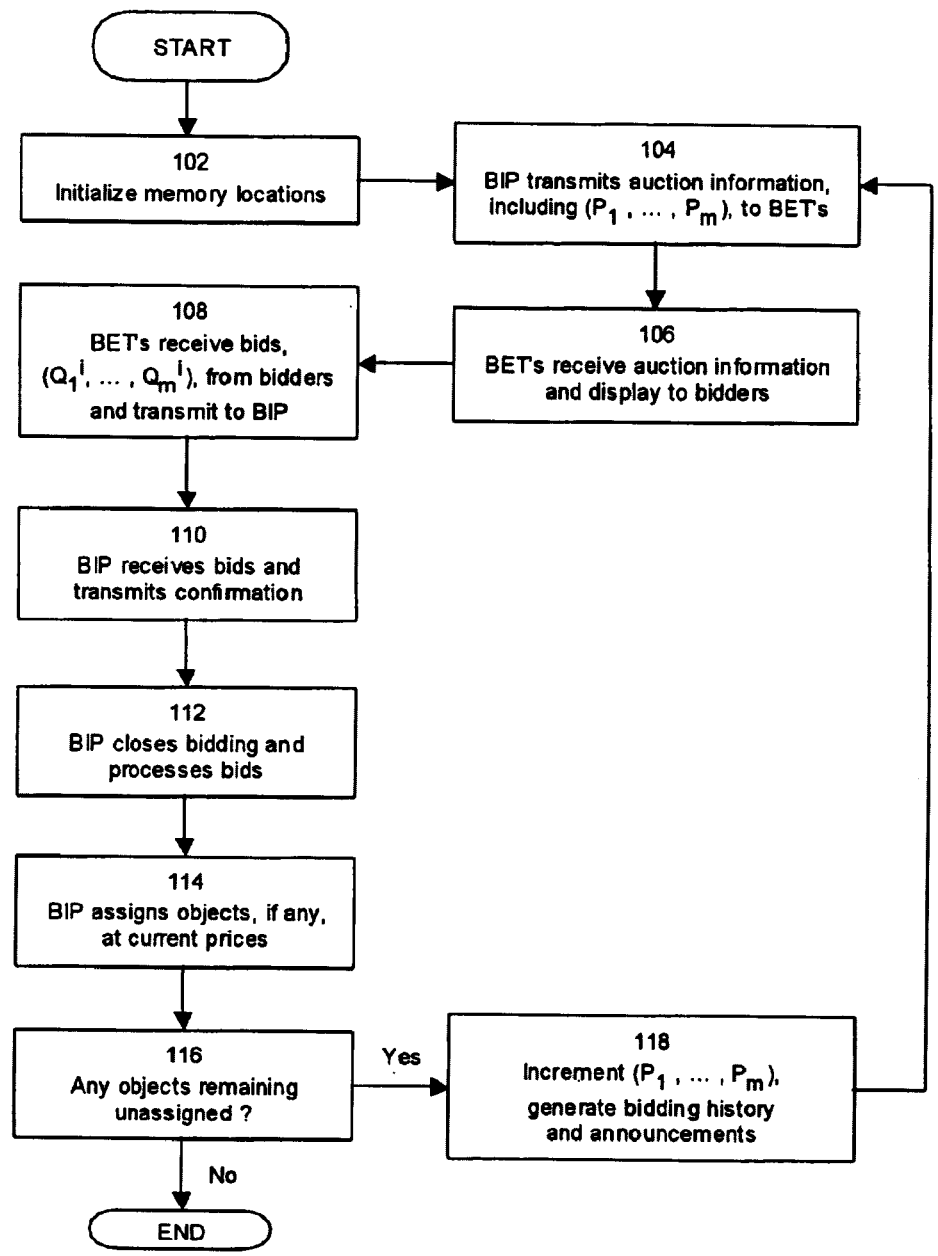
FIG. 7 is a flow diagram of an auction process in accordance with another embodiment of the invention.

FIG. 7 is a flow diagram of an auction process in accordance with one embodiment of the present invention. The process starts with step 102, in which memory locations are initialized. In step 102, the appropriate memory locations are initialized with information such as the number of types of objects for auction, the quantity of each type of object for auction, and the initial price vector. In step 104, the bidding information processor transmits auction information, including the starting price vector $(P_1, \ldots, P_m)$, and transmits it to bid entry terminals. In step 106, bid entry terminals receive auction information from the bidding information processor and display it to bidders. In step 108, bid entry terminals receive bids $(Q_1^i, \ldots, Q_m^i)$ from bidders and transmit them to the bidding information processor. In step 110, the bidding information processor receives the bids transmitted from bid entry terminals and transmits confirmation messages. In step 112, the bidding information processor closes the bidding for the current round and processes bids received from bid entry terminals. This process is shown in more detail in FIG. 9. In step 114, the bidding information processor assigns objects, if any, at the current prices. This process is shown in more detail in FIGS. 8a, 8b and 8c. In step 116, the bidding information processor determines if any objects remain unassigned. If so, the process goes to step 118 in which the bidding information processor increments the current price vector and generates the bidding history and any auction announcements and messages. One exemplary rule for incrementing the price is that, for every $k=1, \ldots, m$, the price $P_k$ of objects of type k is raised by $$c\left[\left(\sum_{i=1}^{n} Q_k^{i,t}\right) - \overline{Q}_k^t\right],$$

where c is a positive constant (i.e., the price for each type is increased in direct proportion to the excess demand for that type). The process then loops to step 104. If no objects remain unassigned, then the process ends.

Figure 8A:
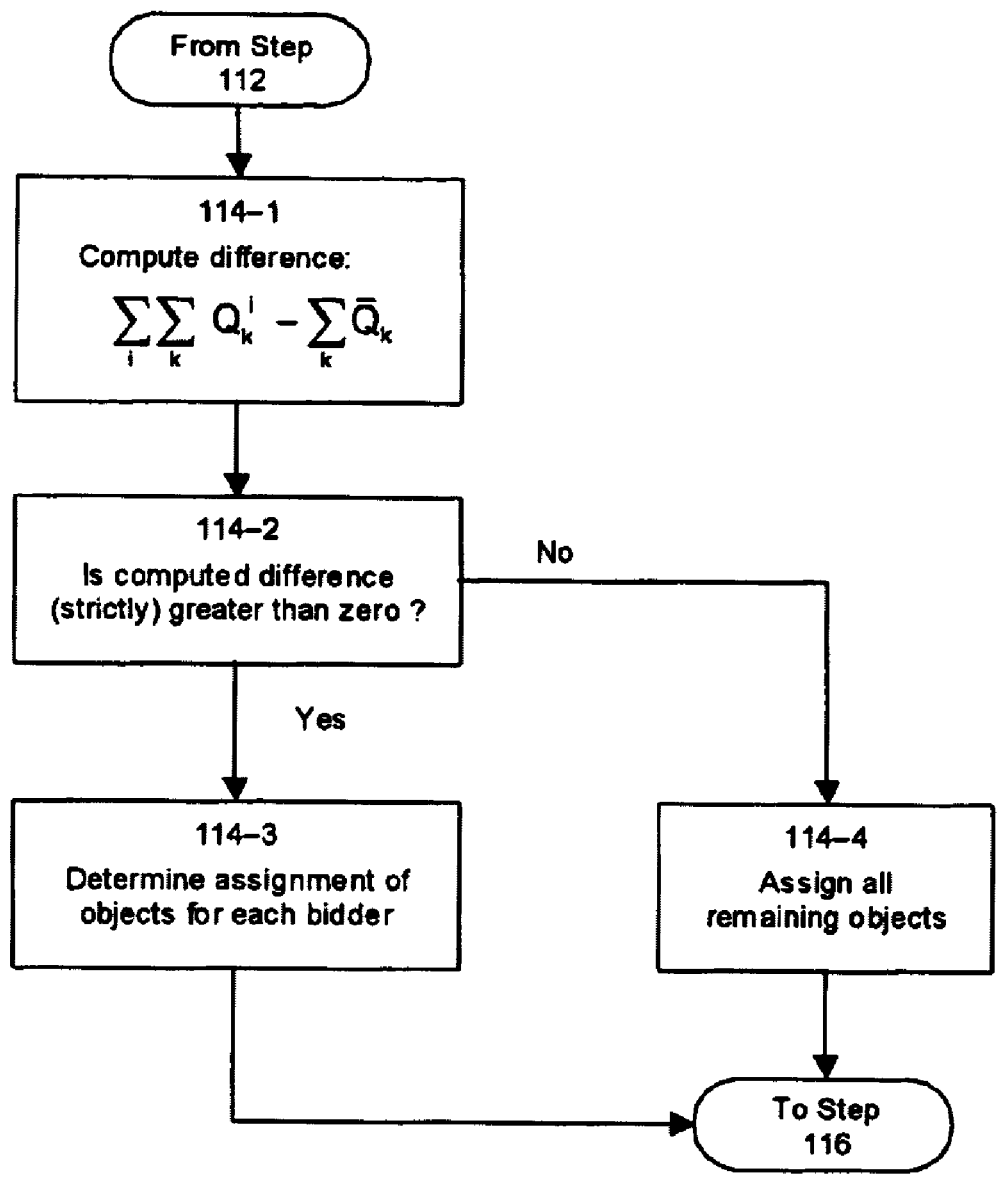
FIGS. 8a, 8b, 8c and 9 are more detailed diagrams illustrating elements of an earlier diagram.

FIG. 8a is a flow diagram of a subprocess of step 114. It begins with step 114-1, in which the bidding information processor sums the quantities demanded by all the bidders and for all the types of objects; also sums the quantities remaining unassigned of all the types of objects; and computes the difference between the two sums. In step 114-2, the bidding information processor determines whether the difference between these two sums is (strictly) greater than zero. If the difference between the two sums is (strictly) greater than zero, the process continues with step 114-3, in which the bidding information processor considers each bidder separately and determines an assignment of objects at the current prices. This step is shown in more detail in FIG. 8b. The process then goes to step 116 of FIG. 7. If the difference between the two sums is not (strictly) greater than zero, the process continues with step 114-4, in which each bidder is assigned the quantity bid for each type of object at the current price, and since no objects remain unassigned, the auction ends after proceeding to step 116 of FIG. 7.

Figure 8B:
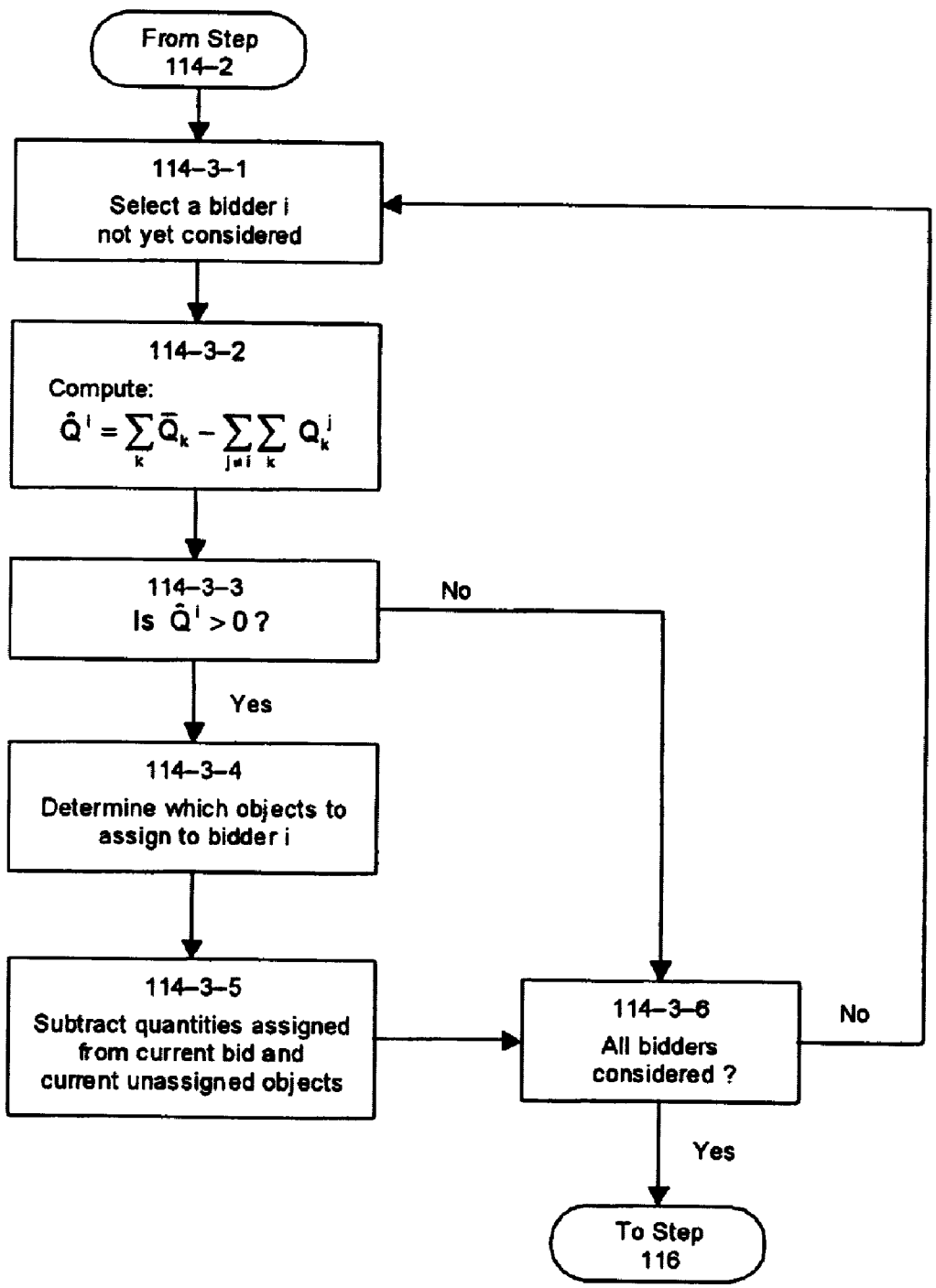

FIG. 8b is a flow diagram of a subprocess of step 114-3. It begins with step 114-3-1, in which a bidder which has not yet been considered is selected. In step 114-3-2, for the bidder currently being considered, the bidding information processor sums the quantities remaining unassigned of all the types of objects; also it sums the quantities demanded by all the bidders other than the current bidder and for all the types of objects; and it computes the difference between the two sums. The difference is denoted $\hat{Q}^i$. In step 114-3-3, the bidding information processor determines whether $\hat{Q}^i$ is (strictly) greater than zero. If $\hat{Q}^i$ is not (strictly) greater than zero, no objects are assigned to the current bidder, and the process proceeds directly to step 114-3-6. If $\hat{Q}^i$ is (strictly) greater than zero, the process continues with step 114-3-4, in which the bidding information processor considers each type of object separately and determines an assignment of objects at the current prices. This step is shown in more detail in FIG. 8c. In step 114-3-5, the bidding information processor subtracts the assigned quantities from the bids of the current bidder and from the quantities for auction. In step 114-3-6, it is determined whether all bidders have been considered. If not, the process loops back to step 114-3-1. If all bidders have been considered, the process goes to step 116 of FIG. 7.

Figure 8C:
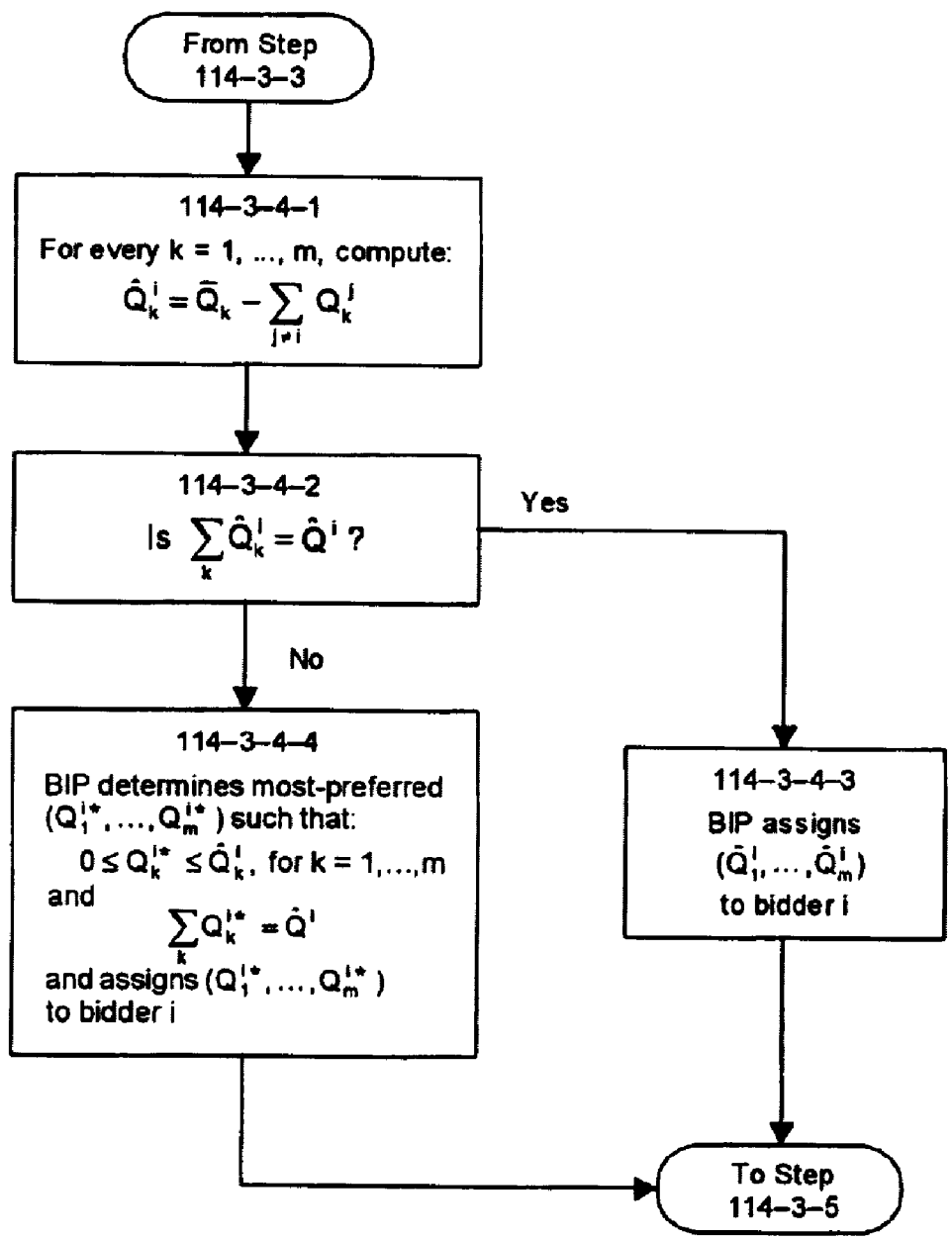

FIG. 8c is a flow diagram of a subprocess of step 114-3-4. It begins with step 114-3-4-1, in which for every type $k=1, \ldots, m$ of object, the bidding information processor sums the quantity demanded of type k by all the bidders other than the current bidder, and subtracts this from the quantity remaining unassigned of type k. The difference is denoted $\hat{Q}_k^i$. In step 114-3-4-2, the bidding information processor determines whether the sum of the $\hat{Q}_k^i$, summed over all types $k=1, \ldots, m$ of objects, equals $\hat{Q}^i$. If the sum of the $\hat{Q}_k^i$ equals $\hat{Q}^i$, then the process continues with step 114-3-4-3. In step 114-3-4-3, $(\hat{Q}_1^i, \ldots, \hat{Q}_m^i)$ is determined to be the assignment to bidder i, and the process goes to step 114-3-5 of FIG. 8b. If the sume of the $\hat{Q}_k^i$ does not equal $\hat{Q}^i$, then the process continues with step 114-3-4-4. In step 114-3-4-4, the bidding information processor determines the most-preferred assignment $(Q_1^{i*} \leq \hat{Q}_k^i$ for every type $k=1, \ldots, m$; and $$\sum_{k=1}^{m} Q_k^{i*} = \hat{Q}^i.$$

One exemplary way of selecting the most-preferred assignment is to select the $(Q_1^{i*}, \ldots, Q_m^{i*})$ consistent with the constraints such that the difference between the expected final price vector and the current price vector, multiplied by $(Q_1^{i*}, \ldots, Q_m^{i*})$ as a dot product, is minimized. The determined $(Q_1^{i*}, \ldots, Q_m^{i*})$ is deemed to be the assignment to bidder i, and the process goes to step 114-3-5 of FIG. 8b.

Figure 9:
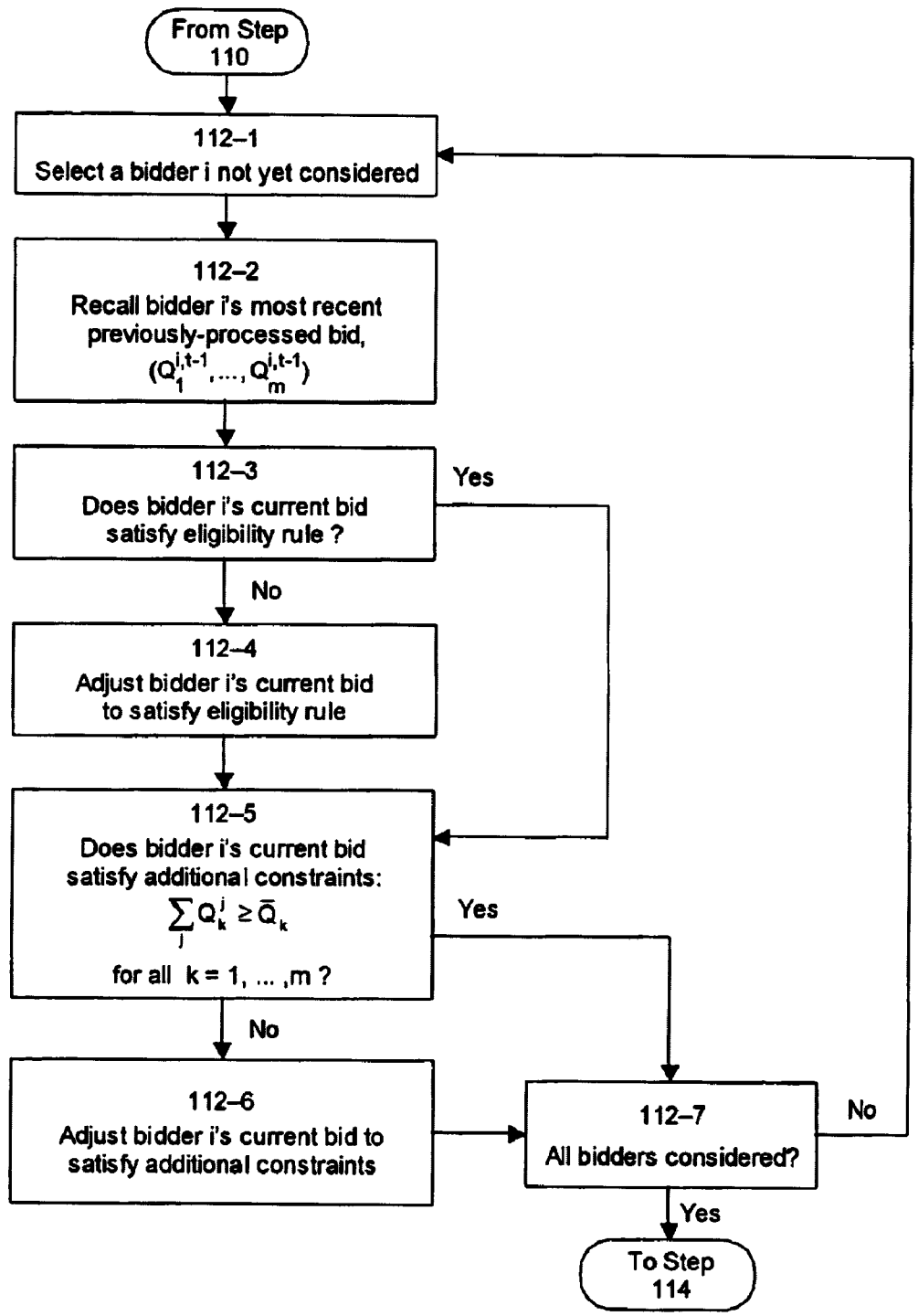

FIG. 9 is a flow diagram of a subprocess of step 112. It begins with step 112-1, in which the bidding information processor considers a bidder who has submitted a bid which has not yet been considered. This bidder is denoted bidder i. One exemplary way of selecting which bidder to consider is to select the earliest-time-stamped bid which has not yet been considered. In step 112-2, the bidding information processor recalls from memory the most recent previously-processed bid by bidder i, the bidder currently being considered. The previously-processed bid is denoted $(Q_1^{i,t-1}, \ldots, Q_m^{i,t-1})$. In step 112-3, the bidding information processor determines whether bidder i's current bid satisfies the eligibility rule:

$$\sum_{k=1}^{m} Q_k^{i,t} \leq \sum_{k=1}^{m} Q_k^{i,t-1}.$$

If the bidder i's current bid satisfies the eligibility rule, then the process skips to step 112-5. If bidder i's current bid does not satisfy the eligibility rule, the process continues with step 112-4, in which the bidding information processor adjusts bidder i's bid so as to satisfy the eligibility rule. One exemplary way of doing this is to insert bidder i's most recent previously-processed bid, $(Q_1^{i,t-1}, \ldots, Q_m^{i,t-1})$, as bidder i's current bid. In step 112-5, the bidding information processor determines whether bidder i's current bid satisfies the additional constraints:

$$\sum_{j=1}^{n} Q_k^j \geq \overline{Q}_k,$$

for all types k=1, . . . , m. If bidder i's current bid satisfies these additional constraints, then the process skips to step 112-7. If bidder i's current bid does not satisfy these additional constraints, the process continues with step 112-6, in which the bidding information processor adjusts bidder i's bid so as to satisfy the additional constraints. One exemplary way of doing this is to insert bidder i's most recent previously-processed bid, $(Q_1^{i,t-1}, \ldots, Q_m^{i,t-1})$, as bidder i's current bid. A second exemplary way of doing this is to substitute $Q_k^i$ with $\overline{Q}_k - \Sigma_{j \neq i} Q_k^j$ as bidder i's quantity for type k, for every k=1, . . . , m violating the additional constraint, provided that this substitution does not lead the eligibility rule to be violated. In step 112-7, the bidding information processor determines whether all bidders who have submitted bids have yet been considered. If not, the process loops back to step 112-1. If all bidders have been considered, the process goes to step 114 of FIG. 7.

Another embodiment of the inventive system is described by the same flow diagrams—except with Step 114-3-4-4 deferred until the end of the auction. In that event, the auctioneer is allowed to wait until the conclusion of the auction to determine which objects were assigned at which prices in the course of the auction.

Another embodiment of the inventive system is described by the same flow diagrams—except with Step 114-3 (and hence FIGS. 8b and 8c) deleted. In that event, the auction still proceeds with multiple ascending clocks, but now objects are not assigned in intermediate rounds, and so every object of a given type is assigned at the same price.

What is claimed is:

1. A method for using a computer to implement an auction of heterogeneous objects, two or more bidders participating in the auction, the auction allowing assignment of objects of the same type to one or more of the bidders at different prices, the method comprising:
    a) inputting, into the computer, bids from participating bidders,
    b) determining at the computer, based on the bids, whether there is at least one object which is desired by only one bidder and,
    c) in the event there is at least one object which is desired by only one bidder, assigning the determined object or objects to the determined bidder,
    and wherein the determining further comprises:
        b11) selecting a bidder,
        b12) selecting an object type,
        b13) determining if bids of other bidders for this object type total less than available objects of this type, and in that event the assigning comprises assigning to the selected bidder the smaller of: the difference between number of available objects of this selected type and sum of bids by other bidders for this object type; and the selected bidder's bid for objects of this selected type.

2. A method as recited in claim 1 in which inputting and determining steps are repetitively performed until all objects are assigned, wherein any bidder is constrained in bidding based on prior bids.

3. A method as recited in claim 1 which includes the further steps of:
    d) validating bids by
        d1) selecting a bidder,
        d2) comparing a most recent bid by the bidder to an earlier bid of the same bidder, and
        d3) determining for each object type if a most recent bid carries a quantity less than an earlier bid,
        d4) in the event the determination of step d3) is positive, determining the sum of all bids for objects of a type that in the event the sum is less than the number available, adjusting the most recent bid, or
        d5) repeating steps d1)–d4) for another bidder.

4. A method for using a computer to implement an auction of hetergeneous objects, two or more bidders participating in the auction, the auction allowing assignment of objects of the same type to one or more of the bidders at different prices, the method comprising:
    a) inputting, into the computer, bids from participating bidders,
    b) determining at the computer, based on the bids, whether there is at least one object which is desired by only one bidder and, if so, assigning the determined object or objects to the determined bidder, and
    c) repeating steps a) and b) until no objects remain unassigned,
    wherein said determining includes:
        b1) selecting a bidder,
        b2) summing, for all other bidders, a first sum representing a quantity of all objects bid for by the other bidders,
        b3) identifying a quantity of all unassigned objects and determining if the quantity is strictly greater than the first sum,
        b4) in the event the quantity is strictly greater than the first sum, then assigning objects either based on the selected bidder's bid or using a most preferred assignment rule, and b5) repeating steps b2) to b4) for each other bidder.

5. A method for using a computer to implement an auction of heterogeneous objects, two or more bidders participating in the auction, the auction allowing assignment of objects of the same type to one or more of the bidders at different prices, the method comprising:
   a) inputting, into the computer, bids from participating bidders,
   b) determining at the computer, based on the bids, whether there is at least one object which is desired by only one bidder and, if so, assigning the determined object or objects to the determined bidder, and
   c) repeating steps a) and b) until no objects remain unassigned,
   which includes the further steps of:
   d) validating bids by
      d1) selecting a bidder,
      d2) comparing a most recent bid by the bidder to an earlier bid of the same bidder, and
      d3) determining for each object type if a most recent bid carries a quantity less than an earlier bid,
      d4) in the event the determination of step d3) is positive, determining the sum of all bids for objects of a type that in the event the sum is less than the number available, adjusting the most recent bid, or
      d5) repeating steps d1)–d4) for another bidder.

6. A computer system implementing an auction of heterogeneous objects, two or more bidders participating in the auction, the auction allowing assignment of objects of the same type to one or more of the bidders at different prices, the computer system including:
   a) means for inputting to the computer, bids from participating bidders,
   b) determining means for determining, based on the bids, whether there is at least one object which is desired by only one bidder and,
   c) assigning means for assigning the determined object or objects to the determined bidder in the event there is at least one object which is desired by only one bidder, wherein the determining means includes:
      b1) means for selecting a bidder,
      b2) means for summing, for all other bidders, a first sum representing a quantity of all objects bid for by the other bidders,
      b3) means for identifying a quantity of all unassigned objects and determining if the quantity is strictly greater than the first sum,
   and wherein the assigning means includes:
      c1) responsive means, in the event the quantity is strictly greater than the first sum, for assigning objects either based on the selected bidder's bid or using a most preferred assignment rule.

7. The system of claim 6 which further includes means for validating bids comprising
   d1) means for selecting a bidder,
   d2) means for comparing a most recent bid by the bidder to an earlier bid of the same bidder, and
   d3) means for determining, for each object type if a most recent bid carries a quantity in excess of an earlier bid, and
   d4) adjusting means for adjusting the most recent bid in the event the most recent bid carries a quantity in excess of an earlier bid.

8. A computer system implementing an auction of heterogeneous objects, two or more bidders participating in the auction, the auction allowing assignment of objects of the same type to one or more of the bidders at different prices, the computer system including:
   a) input means for inputting bids from participating bidders,
   b) determining means for determining, based on the bids, whether there is at least one object which is desired by only one bidder and,
   c) assigning means for assigning, in the event there is at least one object which is desired by only one bidder, the determined object or objects to the determined bidder, wherein the determining means includes:
      b1) means for selecting a bidder,
      b2) means for selecting an object type,
      b3) summing means for determining if bids of other bidders for this object type total less than available objects of this type,
   and wherein the assigning means comprises:
      c1) responsive means, in the event the bids of other bidders for this object type totals less than the number of available objects of this type, for assigning to the selected bidder the smaller of; the difference between number of available objects of this selected type and the total of bids by other bidders for this object type; and the selected bidder's bid for objects of this selected type.

9. The computer system of claim 8 wherein the determining means identifies each object which is desired by only one bidder and in which the assigning means assigns each such object identified by the determining means.

10. The computer system as recited in claim 8 which further includes means for validating bids comprising:
   d1) means for selecting a bidder,
   d2) means for comparing a most recent bid by the bidder to an earlier bid of the same bidder, and
   d3) means for determining, for each object type if a most recent bid carries a quantity in excess of an earlier bid, and
   d4) adjusting means for adjusting the most recent bid in the event the most recent bid carries a quantity in excess of an earlier bid.

11. A method for using at least one computer to implement an auction of at least two types of items, each of the types of items including plural items, the auction allowing submission of bids on the types of items at a plurality of times, the method comprising:
   a) transmitting from a computer a signal representing auction information, said auction information including at least an indicator of a current price for each of the types of items;
   b) receiving bids submitted by a plurality of bidders, each bid indicating at least a quantity of one of the types of items that a bidder wishes to transact at the current price;
   c) constraining bids at a computer to satisfy a condition that a sum of quantities bid by a bidder for all of the types of items at their current prices is no greater than a sum of quantities previously bid by the bidder for all of the types of items;
   d) determining at a computer whether the auction should end or continue, based on a comparison of a sum of quantities that bidders wish to transact at the current price and an available quantity of items;
   e) establishing updated auction information, said auction information including an updated price for at least one of the types of items; and f) initiating at a computer at least one additional opportunity for bidders to submit bids at an updated price following a determination that the auction should continue.

12. The method of claim 11 further including the step of determining, at a computer, whether any units of any of the types of items have been clinched by any bidders and, if so, assigning the units determined to be clinched to the determined bidders.

13. The method of claim 12 wherein clinched units of a given type of item are assigned at a price related to the current price for the given type of item.

14. The method of claim 12 wherein clinched units of a given type of item are assigned at the current price for the given type of item.

15. The method of claim 11 further including the step of assigning units of a given type of item at a price related to the current price for the given type of item.

16. The method of claim 11 further including the step of assigning units of a given type of item at the current price for the given type of item.

17. A system comprising at least one computer for implementing an auction of at least two types of items, each of the types of items including plural items, the auction allowing submission of bids on the types of items at a plurality of times, the system comprising:
   a) transmitting means for transmitting a signal representing auction information, said auction information including at least an indicator of a current price for each of the types of items;
   b) receiving means for receiving bids submitted by a plurality of bidders, each bid indicating at least a quantity of one of the types of items that a bidder wishes to transact at the current price;
   c) constraining means for constraining bids to satisfy a condition that a sum of quantities bid by a bidder for all of the types of items at their current prices is no greater than a sum of quantities previously bid by the bidder for all of the types of items;
   d) first determining means for determining whether the auction should end or continue, based on a comparison of a sum of quantities that bidders wish to transact at the current price and an available quantity of items;
   e) establishing means for establishing updated auction information, said auction information including an updated price for at least one of the types of items; and
   f) initiating means for initiating at least one additional opportunity for bidders to submit bids at an updated price following a determination that the auction should continue.

18. The system of claim 17 which further includes second determining means for determining whether any units of any of the types of items have been clinched by any bidders and, if so, assigning the units determined to be clinched to the determined bidders.

19. The system of claim 18 wherein clinched units of a given type of item are assigned at a price related to the current price for the given type of item.

20. The system of claim 18 which further includes assigning means for assigning quantities that bidders wish to transact, at prices related to the current price, to the respective bidders following a determination that the auction should end.

21. The system of claim 17 which further includes assigning means for assigning units of a given type of item at a price related to the current price for the given type of item.

22. The system of claim 17 which further includes assigning means for assigning units of a given type of item at the current price for the given type of item.

23. The system of claim 17 wherein clinched units of a given type of item are assigned at the current price for the given type of item.

24. A method for using one or more computers to implement an auction of heterogeneous items, said heterogeneous items including m types of items, m equaling an integer of at least two, a bidder submitting bids in the auction at a plurality of times, the method comprising:
   a) outputting, from a computer of said one or more computers, prices ($P_1^t, \ldots, P_m^t$), each price $P_k^t$ indicating the price of items of a given type k at time t;
   b) receiving, into a computer of said one or more computers, bids indicating quantities ($Q_1^{i,t}, \ldots, Q_m^{i,t}$), each quantity $Q_k^{i,t}$ indicating a quantity of items of a given type k that a bidder i wishes to transact at time t;
   c) processing, at a computer of said one or more computers, the received bids, said processing including determining whether the quantities ($Q_1^{i,t}, \ldots, Q_m^{i,t}$) satisfy a constraint that a sum of the quantities $Q_k^{i,t}$, summed over all k from 1 to m, is no greater than a sum of the quantities $Q_k^{i,s}$, summed over all k from 1 to m, where time s is a time preceding time t;
   d) determining, at a computer of said one or more computers, whether the auction should continue, based on the processed bids; and
   e) repeating a)–d) if the auction is determined to continue.

25. The method of claim 24 further including the step of determining, at a computer, whether any units of any of the types of items have been clinched by any bidder and, if so, assigning the units determined to be clinched to the determined bidder.

26. The method of claim 25 wherein clinched units of a given type k of item are assigned at time t at a price related to $P_k^t$.

27. The method of claim 25 wherein clinched units of a given type k of item are assigned at time t at a price equaling $P_k^t$.

28. The method of claim 24 further including the step of assigning units of a given type k of item at time t at a price related to $P_k^t$.

29. The method of claim 24 further including the step of assigning units of a given type k of item at time t at a price equaling $P_k^t$.

30. The method of claim 29 wherein all units that are assigned are assigned at the end of the auction.

31. A system comprising at least one computer for implementing an auction of heterogeneous items, said heterogeneous items including m types of items, m equaling an integer of at least two, a bidder submitting bids in the auction at a plurality of times, the system comprising:
   a) means for outputting prices ($P_1^t, \ldots, P_m^t$), each price $P_k^t$ indicating the price of items of a given type k at time t;
   b) means for receiving a bid indicating quantities ($Q_1^{i,t}, \ldots, Q_m^{i,t}$), each quantity $Q_k^{i,t}$ indicating a quantity of items of a given type k that a bidder i wishes to transact at time t;
   c) means for processing the received bid, said processing including determining whether the quantities ($Q_1^{i,t}, \ldots, Q_m^{i,t}$) satisfy a constraint that a sum of the quantities $Q_k^{i,t}$, summed over all k from 1 to m, is no greater than a sum of the quantities $Q_k^{i,s}$, summed over all k over 1 to m, where time s is a time preceding time t; and d) means for determining whether the auction should continue, based on the processed bids.

32. The system of claim 31 further including second determining means for determining whether any units of any of the types of items have been clinched by any bidder and, if so, assigning the units determined to be clinched to the determined bidder.

33. The system of claim 32 wherein clinched units of a given type k of item are assigned at time t at a price related to $P_k^t$.

34. The system of claim 32 wherein clinched units of a given type k of item are assigned at time t at a price equaling $P_k^t$.

35. The system of claim 31 further including assigning means for assigning units of a given type k of item at time t at a price related to $P_k^t$.

36. The system of claim 31 further including assigning means for assigning units of a given type k of item at time t at a price equaling $P_k^t$.

37. The system of claim 36 wherein all units that are assigned are assigned at the end of the auction.

38. A method for using at least one computer to implement an auction of heterogeneous items, said heterogeneous items including m types of items, m equaling an integer of at least two, n bidders submitting bids in the auction, n equaling an integer of at least two, a bidder submitting bids in the auction at a plurality of times, the method comprising:

a) outputting, from a computer, prices $(P_1^t, \ldots, P_m^t)$, each price $P_k^t$ indicating the price of items of a given type k at time t;

b) receiving, into a computer, a bid indicating quantities $(Q_1^{i,t}, \ldots, Q_m^{i,t})$, each quantity $Q_k^{i,t}$ indicating the quantity of items of a given type k that a bidder i wishes to transact at time t;

c) processing, at a computer, the received bid, said processing including determining whether the quantities $(Q_1^{i,t}, \ldots, Q_m^{i,t})$, together with the quantities $(Q_1^{j,t}, \ldots, Q_m^{j,t})$ of all other bidders j, satisfy a constraint for every type k of item that a sum of the quantities $Q_k^{j,t}$, summed over all bidders j from 1 to n, is no less than an available quantity;

d) determining, at a computer, whether the auction should continue, based on the processed bids; and e) repeating a)–d) if the auction is determined to continue.

39. The method of claim 38 further including the step of determining, at a computer, whether any units of any of the types of items have been clinched by any bidder and, if so, assigning the units determined to be clinched to the determined bidder.

40. The method of claim 39 wherein clinched units of a given type k of item are assigned at time t at a price related to $P_k^t$.

41. The method of claim 39 wherein clinched units of a given type k of item are assigned at time t at a price equaling $P_k^t$.

42. The method of claim 38 further including the step of assigning units of a given type k of item at time t at a price related to $P_k^t$.

43. The method of claim 38 further including the step of assigning units of a given type k of item at time t at a price equaling $P_k^t$.

44. The method of claim 43 wherein all units that are assigned are assigned at the end of the auction.

45. The method of claim 38 wherein the processing step further includes determining whether the quantities $(Q_1^{i,t}, \ldots, Q_m^{i,t})$ satisfy a constraint that a sum of the quantities $Q_k^{i,t}$, summed over all k from 1 to m, is no greater than a sum of the quantities $Q_k^{i,s}$, summed over all k from 1 to m, where time s is a time preceding time t.

46. The method of claim 45 further including the step of determining, at a computer, whether any units of any of the types of items have been clinched by any bidder and, if so, assigning the units determined to be clinched to the determined bladder.

47. The method of claim 46 wherein clinched units of a given type k of item are assigned at time t at a price related to $P_k^t$.

48. The method of claim 46 wherein clinched units of a given type k of item are assigned at time t at a price equaling $P_k^t$.

49. The method of claim 45 further including the step of assigning units of a given type k of item at time t at a price related to $P_k^t$.

50. The method of claim 45 further including the step of assigning units of a given type k of item at time t at a price equaling $P_k^t$.

51. The method of claim 50 wherein all units that are assigned are assigned at the end of the auction.

52. A system comprising at least one computer for implementing an auction of heterogeneous items, said heterogeneous items including m types of items, m equaling an integer of at least two, n bidders submitting bids in the auction, n equaling an integer of at least two, a bidder submitting bids in the auction at a plurality of times, the system comprising:

a) means for outputting prices $(P_1^t, \ldots, P_m^t)$, each price $P_k^t$ indicating the price of items of a given type k at time t;

b) means for receiving a bid indicating quantities $(Q_1^{i,t}, \ldots, Q_m^{i,t})$, each quantity $Q_k^{i,t}$ indicating a quantity of items of a given type k that a bidder i wishes to transact at time t;

c) means for processing the received bid, said processing including determining whether the quantities $(Q_1^{i,t}, \ldots, Q_m^{i,t})$ together with the quantities $(Q_1^{j,t}, \ldots, Q_m^{j,t})$ of all other bidders j, satisfy a constraint for every type k of item that a sum of the quantities $Q_k^{j,t}$, summed over all bidders j from 1 to n, is no less than an available quantity; and d) means for determining whether the auction should continue, based on the processed bids.

53. The system of claim 52 further including second determining means for determining whether any units of any of the types of items have been clinched by any bidder and, if so, assigning the units determined to be clinched to the determined bidder.

54. The system of claim 53 wherein clinched units of a given type k of item are assigned at time t at a price related to $P_k^t$.

55. The system of claim 53 wherein clinched units of a given type k of item are assigned at time t at a price equaling $P_k^t$.

56. The system of claim 52 further including assigning means for assigning units of a given type k of item at time t at a price related to $P_k^t$.

57. The system of claim 52 further including assigning means for assigning units of a given type k of item at time t at a price equaling $P_k^t$.

58. The system of claim 57 wherein all units that are assigned are assigned at the end of the auction.

59. The system of claim 52 wherein the processing means further includes means for determining whether the quantities $(Q_1^{i,t}, \ldots, Q_m^{i,t})$ satisfy a constraint that a sum of the quantities $Q_k^{i,t}$, summed over all k from 1 to m, is no greater than a sum of the quantities $Q_k^{i,s}$, summed over all k from 1 to m, where time s is a time preceding time t.

60. The system of claim 59 further including second determining means for determining whether any units of any of the types of items have been clinched by any bidder and, if so, assigning the units determined to be clinched to the determined bidder.

61. The system of claim 60 wherein clinched units of a given type k of item are assigned at time t at a price related to $P_k^t$.

62. The system of claim 60 wherein clinched units of a given type k of item are assigned at time t at a price equaling $P_k^t$.

63. The system of claim 59 further including assigning means for assigning units of a given type k of item at time t at a price related to $P_k^t$.

64. The system of claim 59 further including assigning means for assigning units of a given type k of item at time t at a price equaling $P_k^t$.

65. The system of claim 64 wherein all units that are assigned are assigned at the end of the auction.

* * * * *